(12) United States Patent
Bao et al.

(10) Patent No.: US 12,482,226 B2
(45) Date of Patent: Nov. 25, 2025

(54) DATA PROCESSING METHOD AND APPARATUS, AND DEVICE

(71) Applicant: SHENZHEN YINWANG INTELLIGENT TECHNOLOGIES CO., LTD., Shenzhen (CN)

(72) Inventors: Narisong Bao, Shenzhen (CN); Guicheng Zhang, Nanjing (CN)

(73) Assignee: Shenzhen Yinwang Intelligent Technologies Co., Ltd.

( * ) Notice: Subject to any disclaimer, the term of this patent is extended or adjusted under 35 U.S.C. 154(b) by 270 days.

(21) Appl. No.: 17/993,609

(22) Filed: Nov. 23, 2022

(65) Prior Publication Data
US 2023/0108895 A1 Apr. 6, 2023

Related U.S. Application Data

(63) Continuation of application No. PCT/CN2020/092381, filed on May 26, 2020.

(51) Int. Cl.
*G06V 10/74* (2022.01)
*G06V 20/40* (2022.01)
*G07C 5/08* (2006.01)

(52) U.S. Cl.
CPC ............ *G06V 10/761* (2022.01); *G06V 20/41* (2022.01); *G07C 5/0841* (2013.01)

(58) Field of Classification Search
CPC .... G06V 10/761; G06V 20/41; G06V 20/597; G06V 10/774; G06V 20/56; G07C 5/0841; G07C 5/0808; G11B 27/031; G06F 18/214; G06F 18/22; G06N 20/20
See application file for complete search history.

(56) References Cited

U.S. PATENT DOCUMENTS

| | | | |
|---|---|---|---|
| 9,925,987 B1 | 3/2018 | Nguyen | |
| 10,706,586 B2 * | 7/2020 | Lindgren | ................... G06T 7/50 |
| 2014/0028848 A1 * | 1/2014 | Takenaka | ............. G11B 27/034 |
| | | | 348/148 |
| 2018/0359445 A1 | 12/2018 | Liao | |

(Continued)

FOREIGN PATENT DOCUMENTS

| | | |
|---|---|---|
| CN | 104535069 A | 4/2015 |
| CN | 107911405 A | 4/2018 |
| CN | 108091133 A | 5/2018 |

(Continued)

OTHER PUBLICATIONS

Translation and original for CN110505423A (Year: 2019).*

(Continued)

*Primary Examiner* — Frederick M Brushaber
(74) *Attorney, Agent, or Firm* — Fish & Richardson P.C.

(57) ABSTRACT

Embodiments of this application provide a data processing method and apparatus, and a device. In an example method, first data and a first historical driving feature are obtained, where the first data includes first driving data of a vehicle in a first time period, and the first historical driving feature is determined based on historical driving data of the vehicle. It is determined, based on the first data and the first historical driving feature, that the vehicle is abnormal in the first time period. A driving record video of the vehicle based on the first time period is annotated.

20 Claims, 26 Drawing Sheets

(56) References Cited

U.S. PATENT DOCUMENTS

2019/0279447 A1* 9/2019 Ricci .................. B60K 35/28
2021/0065552 A1* 3/2021 Jung .................... G08G 1/04

FOREIGN PATENT DOCUMENTS

| CN | 110505423 A | 11/2019 |
| CN | 110807436 A | 2/2020 |
| CN | 110942671 A | 3/2020 |
| CN | 110956800 A | 4/2020 |
| JP | 2001097252 A | 4/2001 |
| JP | 2018022469 A | 2/2018 |
| WO | 2018042922 A1 | 3/2018 |

OTHER PUBLICATIONS

Translation and original for CN110956800A (Year: 2020).*
Li, "Depth—In the era of software-defined vehicles, how can the electronic architecture of intelligent vehicles be transformed to meet digital reshaping?" Apr. 10, 2019, retrieved on Jul. 15, 2024, retrieved from URL <http://www. sohu.com/a/307134394_99919085>, 14 pages.
Extended European Search Report in European Appln No. 20937789. 4, dated Feb. 28, 2023, 7 pages.
Office Action in Japanese Appln. No. 2022-572680, mailed on Apr. 23, 2024, 18 pages (with English translation).
International Search Report and Written Opinion in International Appln. No. PCT/CN2020/092381, mailed on Feb. 20, 2021, 17 pages (with English translation).

* cited by examiner

CONT. FROM
FIG. 8A

Driving record video — 802

| Video clip | Shoot time | Abnormality indication | Abnormality level | Abnormality type | Abnormality description information |
|---|---|---|---|---|---|
| Driving record video 1 | Period 1 | Normal | | | |
| Driving record video 2 | Period 2 | *Abnormal* | *Level 1* | *bnormal brake* | *requent brakes* |
| Driving record video 3 | Period 3 | *Abnormal* | *Level 2* | *bnormal speed* | *Fast speed* |
| Driving record video 4 | Period 4 | Normal | | | |
| Driving record video 5 | Period 5 | Normal | | | |

8 sudden brakes between the 20th minute and the 22nd minute

TO
FIG. 8C
FIG. 8B

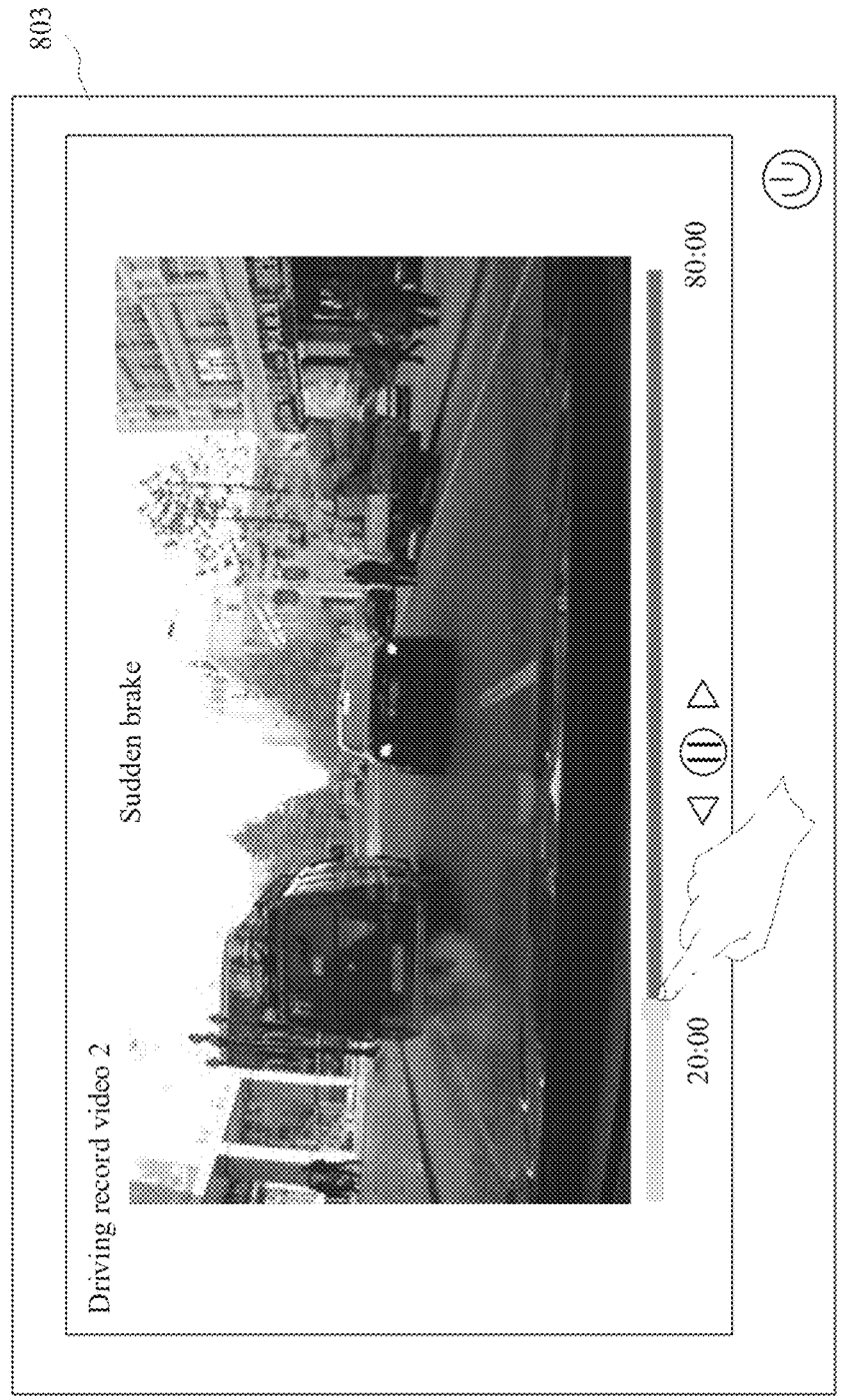

DATA PROCESSING METHOD AND APPARATUS, AND DEVICE

CROSS-REFERENCE TO RELATED APPLICATIONS

This application is a continuation of International Application No. PCT/CN2020/092381, filed on May 26, 2020, the disclosure of which is hereby incorporated by reference in its entirety.

TECHNICAL FIELD

This application relates to the field of intelligent driving and intelligent vehicle technologies, and in particular, to a data processing method and apparatus, and a device.

BACKGROUND

Currently, driving recorders are disposed on many vehicles, and can shoot and store videos of the vehicles during driving processes.

The video shot by the driving recorder and a shooting time of the video may be stored in preset storage space. In a special case, for example, when an accident occurs to the vehicle, or a user recalls a driving scenario, the user needs to search for a corresponding video clip in the preset storage space. In the conventional technology, the user usually estimates an approximate time, and searches for the corresponding video clip in the preset storage space based on the estimated time. However, searching for the video clip in this way is not efficient.

SUMMARY

Embodiments of this application provide a data processing method and apparatus, and a device. This improves efficiency of searching for a video clip.

According to a first aspect, an embodiment of this application provides a data processing method. The method includes: obtaining first data and a first historical driving feature: determining, based on the first data and the first historical driving feature, that a vehicle is abnormal in a first time period; and annotating a driving record video of the vehicle based on the first time period. The first data includes first driving data of the vehicle in the first time period, and the first historical driving feature is determined based on historical driving data of the vehicle.

In the foregoing process, the first data may reflect a driving status of the vehicle in the first time period, and the first historical driving feature may reflect a driving habit of a driver of the vehicle. Because the driving habit of the user is usually fixed, whether the vehicle is abnormal in the first time period can be accurately determined based on the first driving data and the first historical driving feature. When it is determined that the vehicle is abnormal in the first time period, the driving record video shot by an image shooting device may be annotated to record that the vehicle is abnormal in the first time period. In this way, the driving record video can be accurately annotated. The user may accurately and quickly search for a video clip based on an annotation result of the driving record video, to improve video clip searching efficiency.

In a possible implementation, the first driving data includes at least one of the following: status data of a component in the vehicle, running data of a component in the vehicle, or sensor data collected by a component in the vehicle.

In the foregoing process, the first driving data includes one or more of status data, running data, or sensor data of a component. The data is generated in a running process of the vehicle, and can accurately reflect the driving status of the vehicle. Therefore, whether the vehicle is abnormal in the first time period can be accurately determined based on the first driving data.

In a possible implementation, the first historical driving feature includes a plurality of historical data curves corresponding to a plurality of types of historical driving data, the historical data curves are used to indicate a distribution rule of the historical driving data, and the historical driving data includes at least one of the following: historical status data of the component in the vehicle; and historical running data of the component in the vehicle; or historical sensor data collected by the component in the vehicle.

In the foregoing process, the historical driving data includes one or more of historical status data, historical running data, or historical sensor data of a component. The data is generated in a historical running process of the vehicle, and can accurately reflect a historical driving status of the vehicle. The historical driving status of the vehicle reflects the driving habit of the user. Therefore, whether the vehicle is abnormal in the first time period can be accurately determined based on the first historical driving feature.

In a possible implementation, the first historical driving feature may be obtained in the following manner: processing the historical driving data by using a first model to obtain the first historical driving feature. The first model is obtained by learning a plurality of groups of first samples, and each of the plurality of groups of first samples includes sample driving data and a sample historical driving feature.

In the foregoing process, the plurality of groups of first samples are learned, so that the first model has a function of obtaining a driving feature of the driving data. Therefore, the first historical driving feature can be accurately obtained by processing the historical sample data by using the first model.

In a possible implementation, that the vehicle is abnormal in the first time period may be determined based on the first data and the first historical driving feature in the following manner: determining a similarity between the first data and the first historical driving feature; and determining, based on the similarity, that the vehicle is abnormal in the first time period.

In the foregoing process, the similarity between the first data and the first historical driving feature reflects a similarity between a running status of the vehicle in the first time period and the driving habit of the user. Because the driving habit of the user is usually fixed, whether the vehicle is abnormal in the first time period may be accurately determined based on the similarity.

In a possible implementation, the similarity between the first data and the first historical driving feature may be determined in the following manner: processing the first data and the first historical driving feature by using a second model to obtain the similarity. The second model is obtained by learning a plurality of groups of second samples, each of the plurality of groups of second samples includes sample data, a sample driving feature, and a sample similarity, and the sample data includes sample driving data.

In the foregoing process, the plurality of groups of second samples are learned, so that the second model has a function of determining a similarity between data and a driving feature. Therefore, the similarity between the first data and the first historical driving feature may be accurately determined by processing the first data and the first historical driving feature by using the second model.

In a possible implementation, the processing the first data and the first historical driving feature by using a second model to obtain the similarity includes: determining, by using the second model, a first data curve corresponding to the first data; and comparing the first data curve with the historical data curve in the first historical driving feature by using the second model to obtain the similarity.

In the foregoing process, the first data curve can accurately reflect the first data. Therefore, the similarity can be accurately obtained by comparing the first data curve with the historical data curve.

In a possible implementation, the first data further includes scenario data, and the scenario data includes at least one of the following information: time information, location information, road condition information, or weather information.

In the foregoing process, driving habits of the user in different scenarios (for example, under different weather or different road conditions) may be different. Therefore, when the first data further includes the scenario data, a scenario in which the user is driving in the first time period may be determined based on the scenario data. In this way, whether the vehicle is abnormal in the first time period can be more accurately determined based on the first data.

In a possible implementation, the first historical driving feature may be obtained in the following manner: determining the first historical driving feature from a plurality of historical driving features based on the scenario data.

In the foregoing process, the obtained first historical driving feature is related to the scenario data, so that a scenario corresponding to the first data is the same as a scenario corresponding to the first historical driving feature, and accuracy of determining whether the vehicle is abnormal in the first time period is high.

In a possible implementation, the driving record video of the vehicle may be annotated based on the first time period in the following manner: generating abnormality information; and annotating the abnormality information in the driving record video based on the first time period.

In a possible implementation, the abnormality information includes at least one of the following information: an abnormality level, an abnormality type, or abnormality description information.

In the foregoing process, the abnormality information is annotated in the driving record video, so that the user can accurately and quickly search for the video clip based on the annotation result of the driving record video. This improves video clip search efficiency.

According to a second aspect, an embodiment of this application provides a data processing apparatus, including an obtaining module, a determining module, and an annotation module.

The obtaining module is configured to obtain first data and a first historical driving feature, the first data includes first driving data of a vehicle in a first time period, and the first historical driving feature is determined based on historical driving data of the vehicle.

The determining module is configured to determine, based on the first data and the first historical driving feature, that the vehicle is abnormal in the first time period.

The annotation module is configured to annotate a driving record video of the vehicle based on the first time period.

In a possible implementation, the first driving data includes at least one of the following:
  status data of a component in the vehicle;
  running data of a component in the vehicle; or
  sensor data collected by a component in the vehicle.

In a possible implementation, the first historical driving feature includes a plurality of historical data curves corresponding to a plurality of types of historical driving data, the historical data curves are used to indicate a distribution rule of the historical driving data, and the historical driving data includes at least one of the following:
  historical status data of the component in the vehicle;
  historical running data of the component in the vehicle: or
  historical sensor data collected by the component in the vehicle.

In a possible implementation, the obtaining module is specifically configured to:
  process the historical driving data by using a first model, to obtain the first historical driving feature.

The first model is obtained by learning a plurality of groups of first samples, and each of the plurality of groups of first samples includes sample driving data and a sample historical driving feature.

In a possible implementation, the determining module is specifically configured to:
  determine a similarity between the first data and the first historical driving feature; and
  determine, based on the similarity, that the vehicle is abnormal in the first time period.

In a possible implementation, the determining module is specifically configured to:
  process the first data and the first historical driving feature by using a second model, to obtain the similarity.

The second model is obtained by learning a plurality of groups of second samples, each of the plurality of groups of second samples includes sample data, a sample driving feature, and a sample similarity, and the sample data includes sample driving data.

In a possible implementation, the determining module is specifically configured to:
  determine, by using the second model, a first data curve corresponding to the first data; and
  compare the first data curve with the historical data curve in the first historical driving feature by using the second model to obtain the similarity.

In a possible implementation, the first data further includes scenario data, and the scenario data includes at least one of the following information:
  time information, location information, road condition information, or weather information.

In a possible implementation, the determining module is specifically configured to:
  determine the first historical driving feature from a plurality of historical driving features based on the scenario data.

In a possible implementation, the annotation module is specifically configured to:
  generate abnormality information; and
  annotate the abnormality information in the driving record video based on the first time period.

In a possible implementation, the abnormality information includes at least one of the following information:
  an abnormality level, an abnormality type, or abnormality description information.

According to a third aspect, an embodiment of this application provides a data processing apparatus. The data processing apparatus includes a memory and a processor.

The memory stores computer program instructions, and the processor runs the computer program instructions to perform the operation according to any implementation of the first aspect.

According to a fourth aspect, an embodiment of this application provides a computer storage medium, including computer instructions. When the computer instructions are run by a processor, the method according to any implementation of the first aspect is implemented.

According to a fifth aspect, an embodiment of this application provides a computer program product. When the computer program product runs on a processor, the method according to any implementation of the first aspect is implemented.

Based on a data processing method and apparatus, and a device provided in embodiments of this application, first data and a first historical driving feature of a vehicle in a first time period may be obtained, that the vehicle is abnormal in the first time period is determined based on the first data and the first historical driving feature, and a driving record video of the vehicle is annotated based on the first time period. The first data can reflect a driving status of the vehicle in the first time period, and the first historical driving feature can reflect a driving habit of a driver of the vehicle. Because the driving habit of the user is usually fixed, whether the vehicle is abnormal in the first time period can be determined based on the first driving data and the first historical driving feature. When it is determined that the vehicle is abnormal in the first time period, the driving record video shot by an image shooting device may be annotated to record that the vehicle is abnormal in the first time period. In this way, the driving record video can be accurately annotated. The user may accurately and quickly search for a video clip based on an annotation result of the driving record video, to improve video clip searching efficiency.

BRIEF DESCRIPTION OF DRAWINGS

FIG. 8A to FIG. 8C are schematic diagrams of a video viewing manner according to an embodiment of this application;

DESCRIPTION OF EMBODIMENTS

For ease of understanding, concepts in this application are first described.

Vehicle: A vehicle in this application may include a private car, a bus, a cargo van, a passenger vehicle, a motorcycle, and the like.

Component in a vehicle: A component in a vehicle may be a part or a sensor in the vehicle, and the part may be a component that maintains running of the vehicle. For example, the part may include an engine, a generator, a shock absorber, a vehicle light, or the like. The sensor may include a temperature sensor, a speed sensor, an acceleration sensor, or the like.

Driving data: data generated in a driving process of a vehicle. The driving data may include at least one of the following: status data of a component, running data of a component, or sensor data collected by a component.

Status data is used to indicate a status of a component. For example, status data of a vehicle light is used to indicate that a status of the vehicle light is on or off, status data of an engine is used to indicate that a status of the engine is started or paused, and status data of an electromagnetic valve is used to indicate that a status of the electromagnetic valve is on or off.

Running data is used to indicate data generated in a running process of a component. For example, running data of an engine may include a rotational speed of the engine, running data of an electronic gear shifter may include a gear of the electronic gear shifter, and running data of a battery may include remaining electricity of the battery.

Sensor data refers to data collected by a sensor. For example, the sensor data may include: a temperature collected by a temperature sensor, a speed collected by a speed sensor, and an air-fuel ratio collected by an air-fuel ratio sensor.

Different components may generate different data, and a component may generate one or more of status data, running data, and sensor data. For example, some components may generate status data, some components may generate status data and running data, and some components may generate sensor data. For example, a headliner switch may generate status data, an engine may generate status data and running data, and a temperature sensor may generate sensor data.

Driving record video: a video obtained by shooting a vehicle during a driving process. The video may include a video obtained by shooting a surrounding of a vehicle body and a video obtained by shooting an interior of the vehicle. The video is shot by an image shooting device. The image shooting device may be an apparatus built in the vehicle, or may be an apparatus installed on the vehicle.

Figure 1:
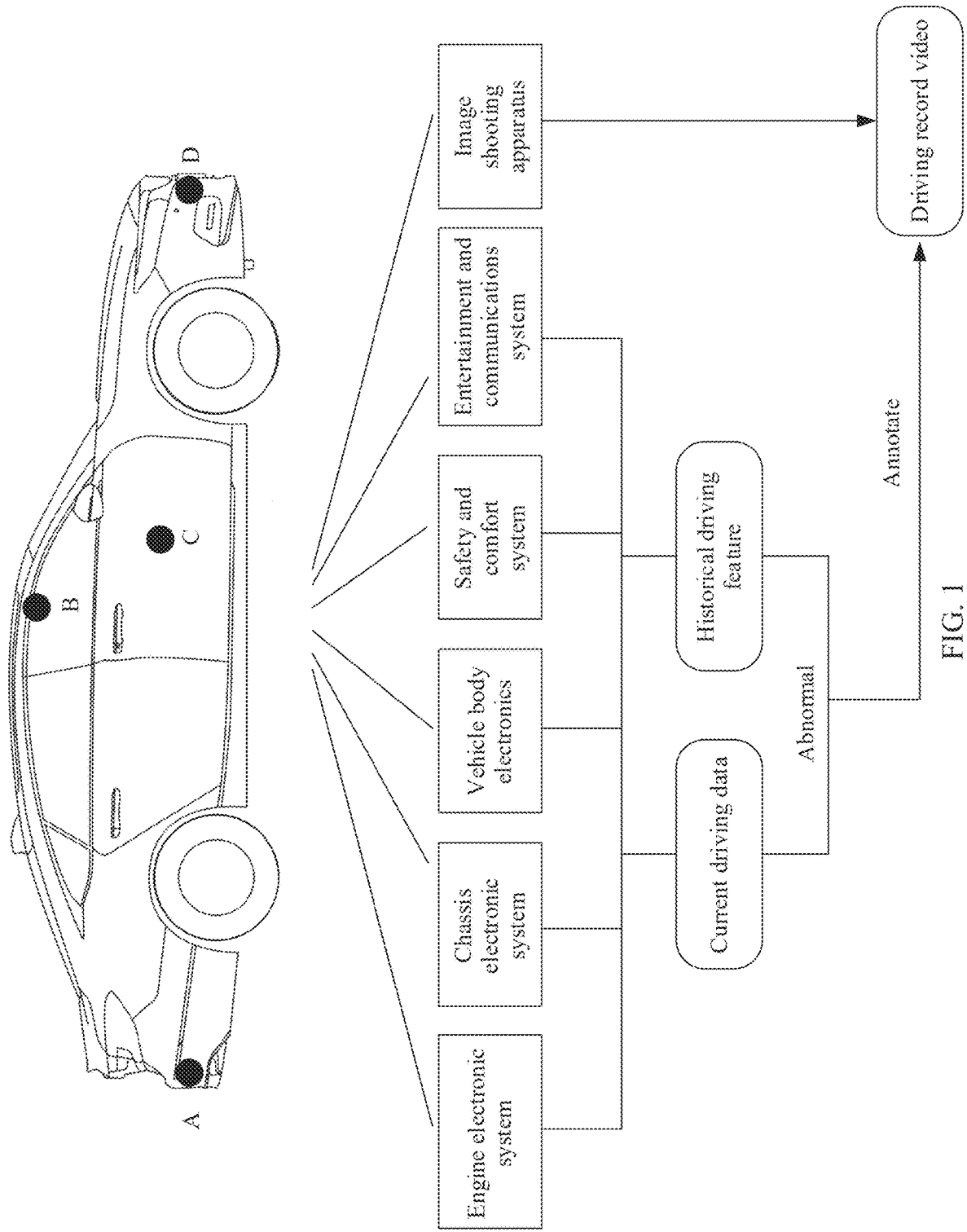
FIG. 1 is a schematic diagram of an application scenario according to an embodiment of this application.

For ease of understanding, the following describes, with reference to FIG. 1, an application scenario to which this application is applicable.

FIG. 1 is a schematic diagram of an application scenario according to an embodiment of this application. As shown in FIG. 1, a vehicle includes an engine electronic system, a chassis electronic system, vehicle body electronics, a safety and comfort system, an entertainment and communications system, and an image shooting device.

The engine electronic system may include: an engine management electronic control unit (ECU), a battery, a generator, a starter, a temperature sensor, a knock sensor, an air-fuel ratio sensor, an oxygen sensor, an engine harness, a cooling system, an ignition system, an intake and exhaust system, a transmission system, an electric feed pump, and the like.

The chassis electronic system may include: a steering system, a suspension system, a braking system, and the like.

The vehicle body electronics may include: a business continuity management (BCM) system, a relay/fuse, a floor harness, a door harness, a headliner harness, a dashboard harness, a universal serial bus (USB)/high-definition multimedia interface (HDMI) cable, an electric rearview mirror, a window lifting motor, an electric tailgate strut, a door and window switch, a wiper motor, a sunroof motor, on-board diagnostics (OBD), a lighting system, a switch, and the like.

The safety and comfort system may include: a safety system, a seat adjustment motor, an active noise cancellation unit, a horn, an air conditioning system, and the like.

The entertainment and communications system may include a human-machine interaction (HMI) system, a communications system, and the like.

The image shooting device may be disposed outside the vehicle and/or inside the vehicle, and there may be one or more image shooting devices. For example, an image shooting device may be disposed at a point A, a point B, a point C, or a point D of the vehicle. The image shooting device may shoot a video. For example, the image shooting device may shoot a video during a running (or starting) process of the vehicle. Optionally, storage space may be set in the vehicle, and a video shot by the image shooting device may be stored in the storage space. Optionally, a wireless communications module may be disposed in the vehicle, and the wireless communications module may send a video shot by the image shooting device to a cloud server or send a video shot by the image shooting device to a terminal device (for example, a device such as a mobile phone or a computer) of a user.

It should be noted that the foregoing merely shows an example of components included in a vehicle, but does not constitute a limitation on the components in the vehicle.

During a driving (or operating) process of a vehicle, driving data of the vehicle may be obtained A historical driving feature of the vehicle may be determined based on historical driving data of the vehicle, and the historical driving feature of the vehicle may represent a driving habit of a driver of the vehicle. First driving data of the vehicle in a first time period (for example, a time period before a current moment) may indicate a driving status of the vehicle in the first time period. Because the driving habit of the user is usually fixed, whether the vehicle is abnormal in the first time period can be determined by comparing the first driving data and the historical driving feature of the vehicle. When it is determined that the vehicle is abnormal in the first time period, a driving record video shot by an image shooting device may be annotated, to record that the vehicle is abnormal in the first time period. Optionally, a case in which the vehicle is abnormal may include: a vehicle fault, a car accident, or abnormal driving of the user. The abnormal driving of the user may include: the user drives extremely fast, the user drives extremely slow, the user drives the vehicle to loiter in an area, and the like.

The user may view the driving record video (a video shot by the image shooting device, or a video obtained after the video shot by the image shooting device is annotated) by using a terminal device. Optionally, the terminal device may obtain the driving record video in a plurality of manners. The following describes several manners of obtaining the driving record video by the terminal device with reference to FIG. 2A to FIG. 2C.

Figure 2A:
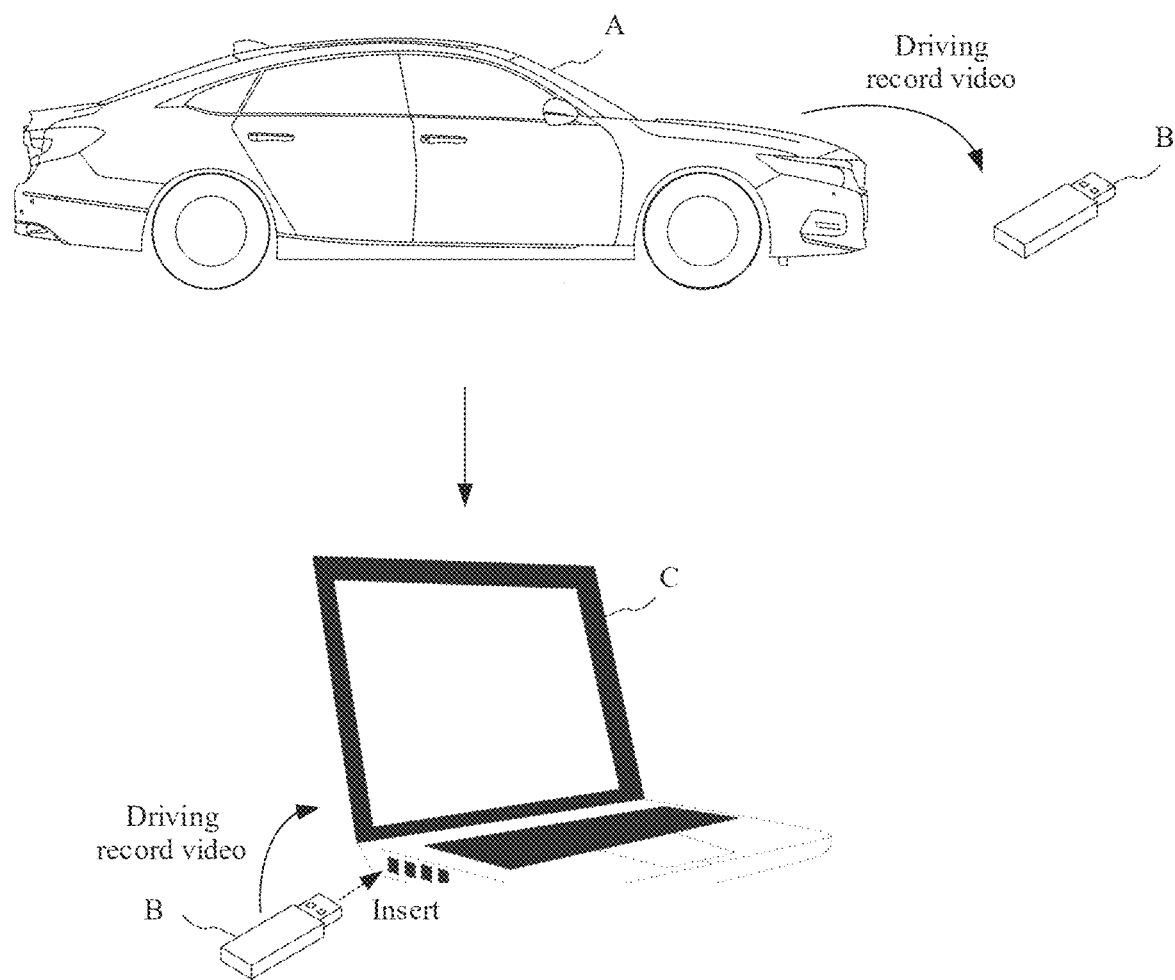
FIG. 2A is a schematic diagram of a video obtaining manner according to an embodiment of this application.

FIG. 2A is a schematic diagram of a video obtaining manner according to an embodiment of this application. As shown in FIG. 2A, there are a vehicle A, a removable hard disk B, and a terminal device C.

The driving record video may be stored in preset storage space in the vehicle A. In this case, when the user needs to view the driving record video by using the terminal device C, the user may copy the driving record video in the storage space to the removable hard disk B. and then copy the driving record video to the terminal device C.

The driving record video may be stored in the removable hard disk B. For example, the removable hard disk B is inserted into the vehicle, and a video shot by the image shooting device is stored in the removable hard disk B. In this case, when the user needs to view the driving record video by using the terminal device C, the user may remove the removable hard disk B from the vehicle, and then copy the driving record video in the removable hard disk B to the terminal device C.

Figure 2B:
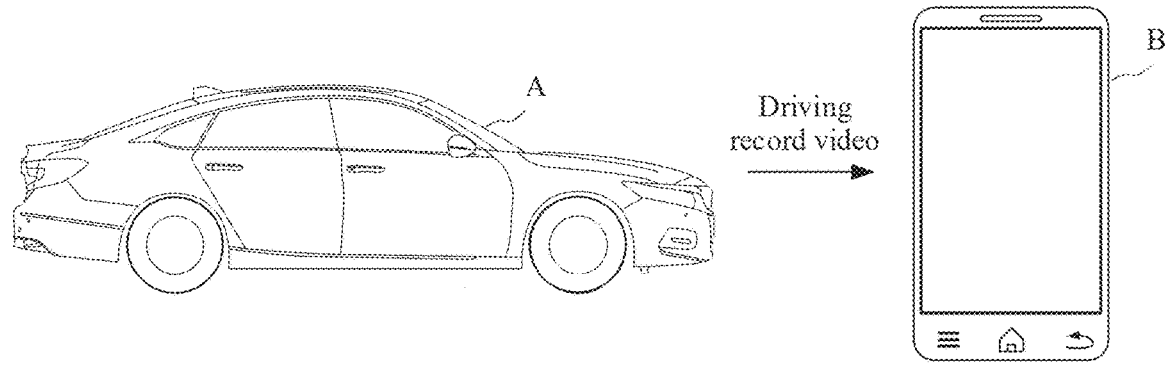
FIG. 2B is a schematic diagram of another video obtaining manner according to an embodiment of this application.

FIG. 2B is a schematic diagram of another video obtaining manner according to an embodiment of this application. As shown in FIG. 2B, there are a vehicle A and a terminal device B. The driving record video may be stored in preset storage space in the vehicle A. A communications module is disposed in the vehicle A, and the vehicle A may communicate with the terminal device B by using the communications module. For example, the vehicle A may communicate with the terminal device B via Bluetooth or Wi-Fi. An application may be installed in the terminal device B, and a user may control, by using the application, transmission of the video in the preset storage space of the vehicle A to the terminal device B. For example, the user may select a driving record video of a specific time period by using the application, so that the vehicle transmits the driving record video of the specific time period to the terminal device.

Figure 2C:
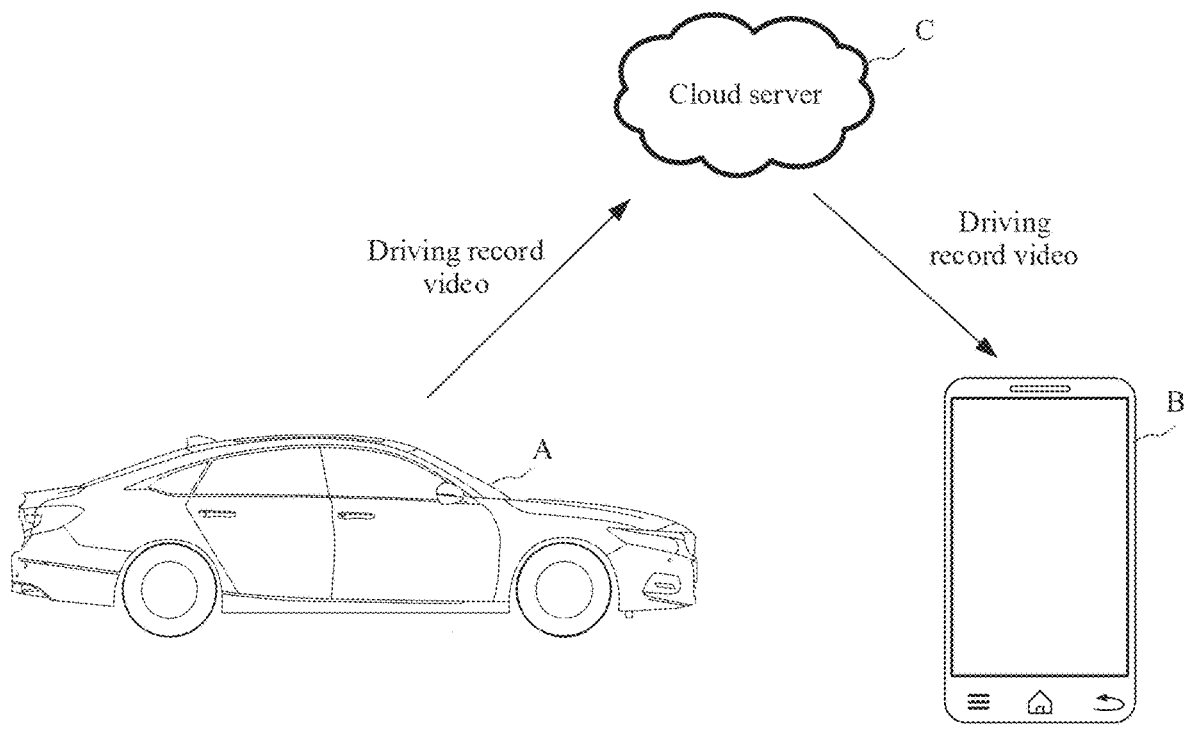
FIG. 2C is a schematic diagram of still another video obtaining manner according to an embodiment of this application.

FIG. 2C is a schematic diagram of still another video obtaining manner according to an embodiment of this application. As shown in FIG. 2C, there are a vehicle A, a terminal device B, and a cloud server C. A communications module is disposed in the vehicle A. The vehicle A may upload a driving record video to the cloud server C by using the communications module, and the cloud server C stores the driving record video. An application may be installed in the terminal device B. and a user may control, by using the application, the terminal device B to download the driving record video from the cloud server C. For example, the user may select a driving record video of a specific time period by using the application, so that the terminal device B requests to download the driving record video of the specific time period from the cloud server C.

It should be noted that FIG. 2A to FIG. 2C merely show examples of manners in which a terminal device obtains a driving record video, and do not constitute a limitation on the manners.

The following describes the technical solutions of this application in detail by using specific embodiments. It should be noted that the following specific embodiments may exist independently or may be combined with each other, and same or similar content is not repeatedly described in different embodiments.

Figure 3:
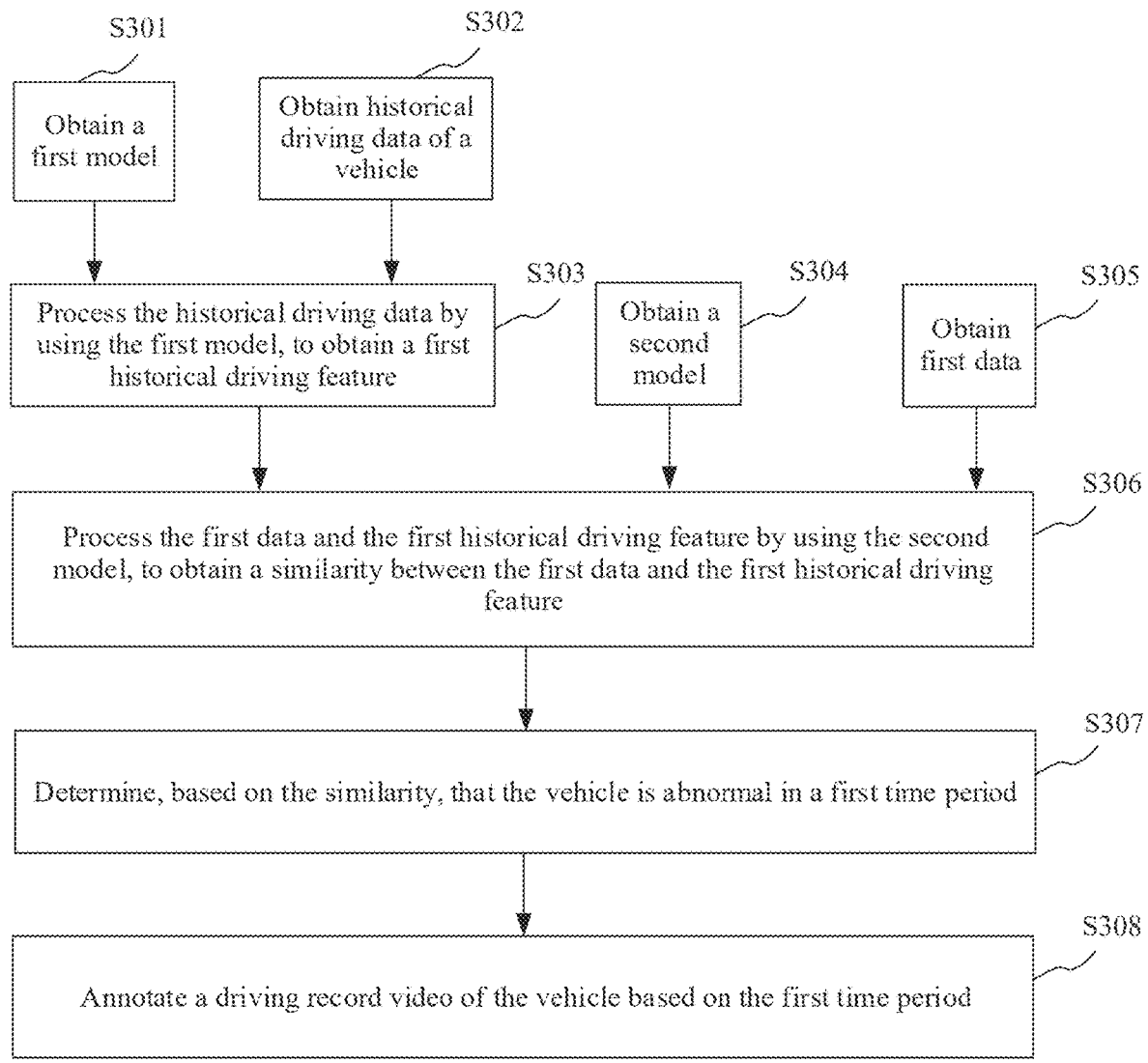
FIG. 3 is a schematic flowchart of a data processing method according to an embodiment of this application.

FIG. 3 is a schematic flowchart of a data processing method according to an embodiment of this application. Refer to FIG. 3. The method may include the following steps.

S301: Obtain a first model.

An execution body for this embodiment of this application may be a vehicle, a driving recorder, or a data processing apparatus disposed in the vehicle or the driving recorder. The data processing apparatus may be implemented by using software, or may be implemented by using a combination of software and hardware. For example, the data processing apparatus may be a processing chip.

For ease of description, the following uses an example in which an execution body is a driving recorder for description.

The first model is used to process driving data to obtain a corresponding driving feature. The driving feature may be represented by using a curve. For example, the driving feature may represent a distribution rule of the driving data.

Figure 4:
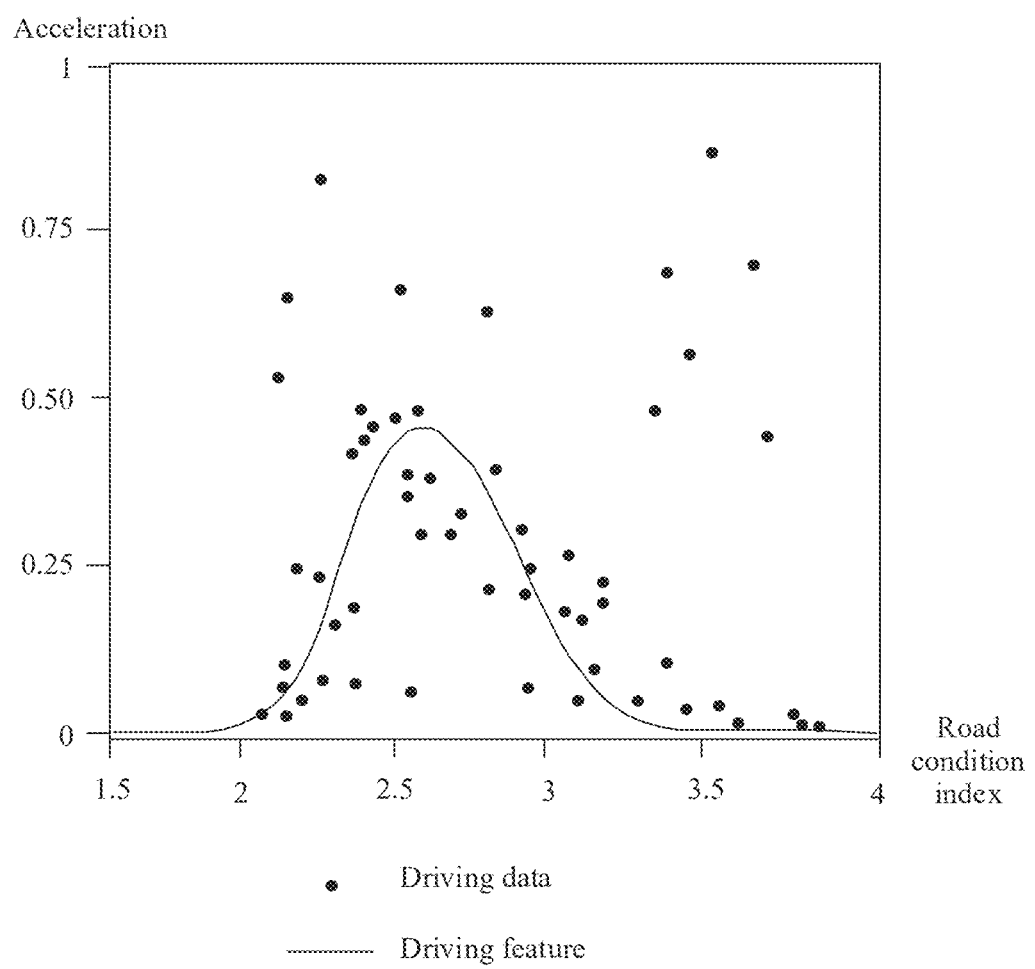
FIG. 4 is a schematic diagram of driving data and a driving feature according to an embodiment of this application.

With reference to FIG. 4, the following describes the driving data and the driving feature by using an example in which the driving data is an acceleration.

FIG. 4 is a schematic diagram of driving data and a driving feature according to an embodiment of this application. As shown in FIG. 4, a horizontal axis of a coordinate system represents a road condition index, and the road condition index may be determined based on parameters such as a congestion degree of a road and weather. A vertical axis of the coordinate system represents a normalized acceleration. Points in the coordinate system represent discrete accelerations (driving data), and the accelerations may be accelerations that are in different road conditions and that are collected in a preset time period. A curve in the coordinate system represents the driving feature (which may also be referred to as an acceleration feature), and the driving feature may indicate a distribution rule of accelerations.

Optionally, the first model may be obtained in the following manners.

First manner: A device other than a driving recorder generates a first model, and the driving recorder obtains the first model from the device.

Optionally, the device may be a server, a terminal device, or the like.

The device may generate the first model in the following manner: obtaining a plurality of groups of first samples, and learning the plurality of groups of first samples to obtain the first model. Each group of first samples includes sample driving data and a sample driving feature.

Optionally, the sample driving data in one group of first samples may be one type of driving data. The type of the driving data may be a speed, an acceleration, an engine rotation speed, an engine temperature, or the like. For example, the sample driving data in one group of first samples may be a speed in a preset time period. In one group of sample data, the sample driving feature corresponds to the sample driving data, and the sample driving feature is used to reflect a feature of the sample driving data. Optionally, the sample driving feature may be represented by a sample curve, and the sample curve is used to indicate a distribution rule of the sample driving data. The sample driving feature may be obtained by annotating the sample driving data manually.

Algorithms for learning the first model may include: a logistic regression algorithm, a decision tree algorithm, a vector machine algorithm, a naïve Bayes algorithm, and the like.

After the first model is obtained by learning the plurality of groups of first samples, the first model has the following function: After the driving data is input to the first model, the first model may process the driving data, to output a driving feature corresponding to the driving data.

After the device other than the driving recorder obtains the first model through learning, the driving recorder may obtain the first model from the device. The first model may be an offline model.

Second manner: A driving recorder generates a first model.

It should be noted that, for a process in which the driving recorder generates the first model, refer to the first manner. Details are not described herein again.

S302: Obtain historical driving data of the vehicle.

The historical driving data may be data generated in a historical driving process of the vehicle. The historical driving process may be a driving process of the vehicle in a historical time period. The historical time period may be one week, one month, half a year, one year, or the like before a current moment. The historical time period may be set based on an actual situation.

Optionally, the historical driving data includes at least one of the following:

historical status data of a component in the vehicle; and historical running data of a component in the vehicle: or historical sensor data collected by a component in the vehicle.

It should be noted that for descriptions of the historical driving data, refer to the foregoing descriptions of the driving data. Details are not described herein again.

Optionally, after the vehicle is started, most components in the vehicle start to work, and generate driving data. The driving recorder can obtain the historical driving data generated by the vehicle. For ease of understanding, the following describes, with reference to FIG. 5A and FIG. 5B, a manner in which the driving recorder obtains the historical driving data.

Figure 5A:
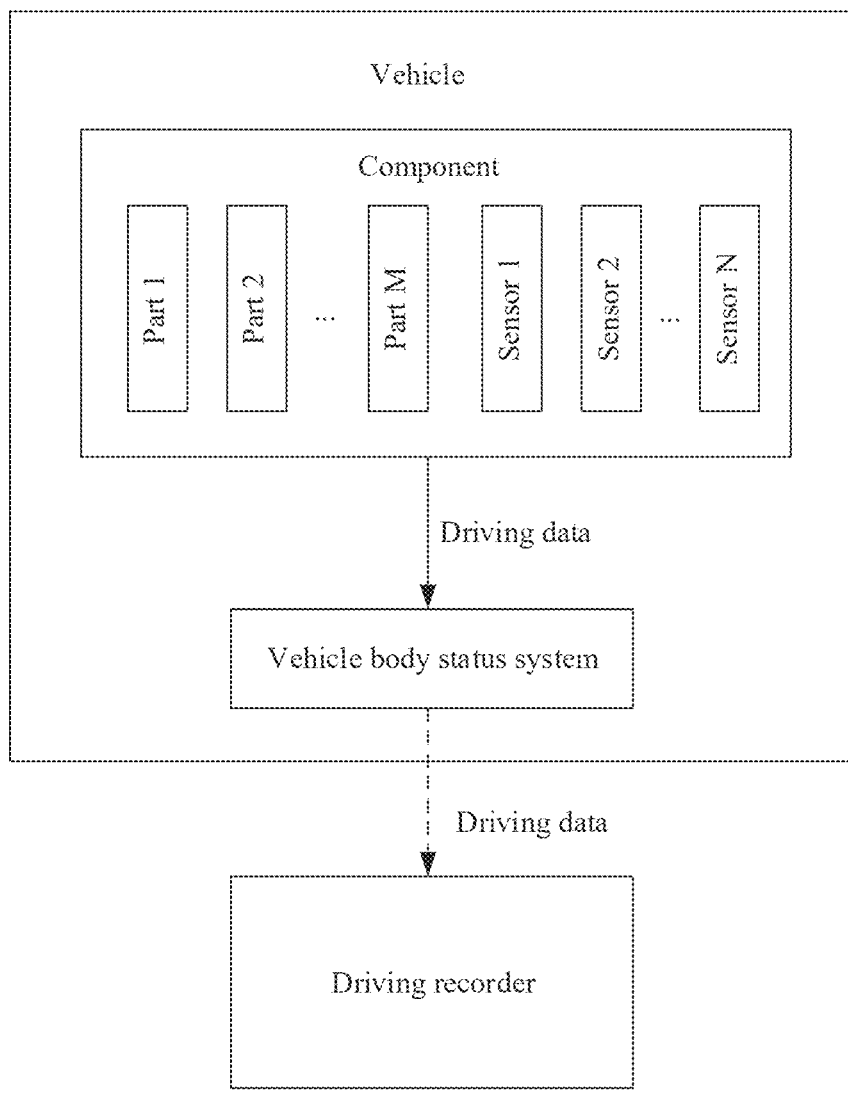
FIG. 5A is a schematic diagram of a manner of obtaining historical driving data according to an embodiment of this application.

FIG. 5A is a schematic diagram of obtaining historical driving data according to an embodiment of this application. As shown in FIG. 5A, a vehicle includes a plurality of components and a vehicle body status system, and the plurality of components include a plurality of parts and a plurality of sensors. After the vehicle is started, most components may start to work. Components that start to work may generate driving data, and the vehicle body status system may obtain and store the driving data generated by the components. The driving recorder and the vehicle body status system may communicate with each other. For example, the driving recorder and the vehicle body status system may be connected in a wired manner or in a wireless manner, so that the driving recorder may obtain historical driving data from the vehicle body status system.

Figure 5B:
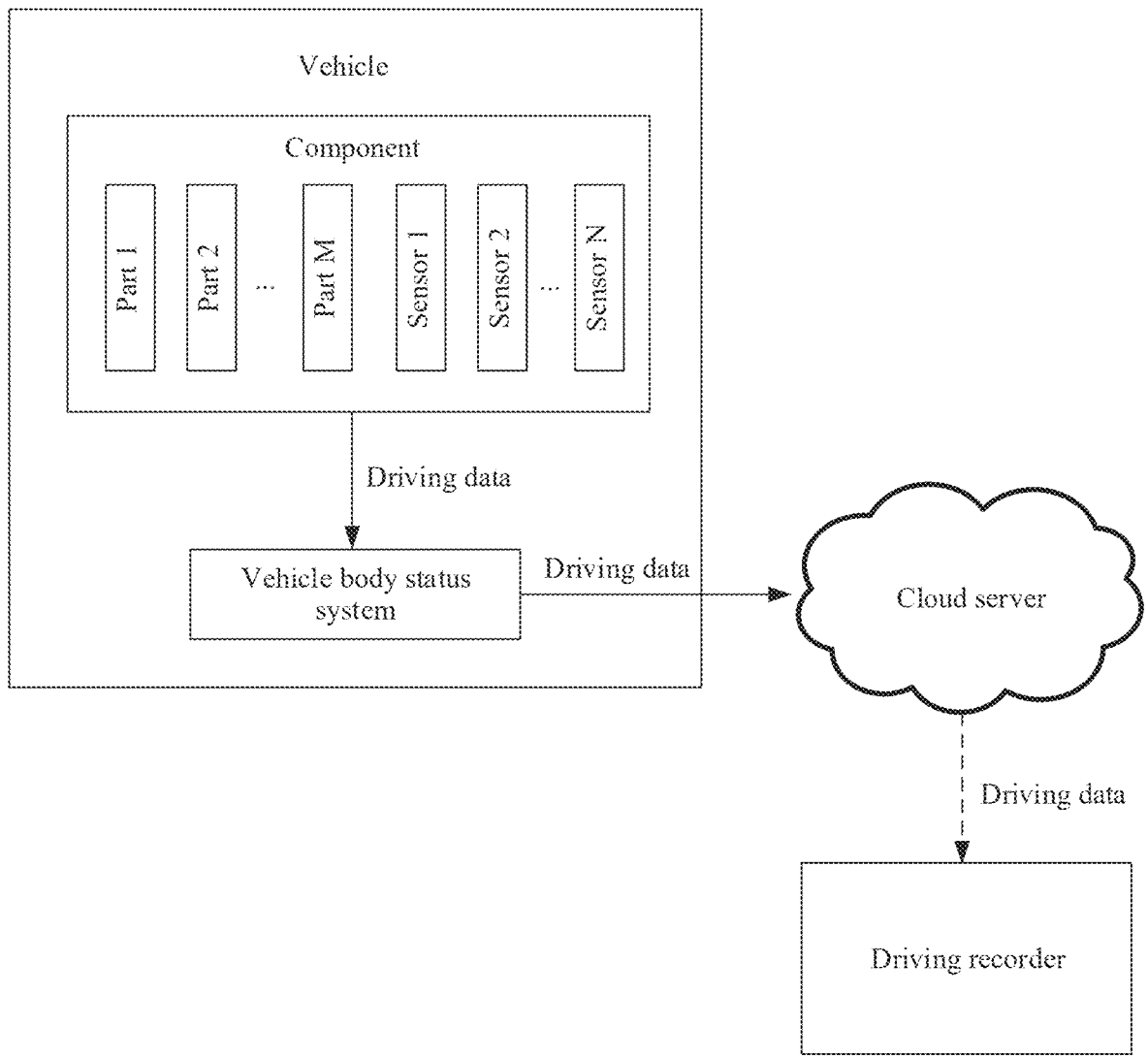
FIG. 5B is a schematic diagram of another manner of obtaining historical driving data according to an embodiment of this application.

FIG. 5B is a schematic diagram of another manner of obtaining historical driving data according to an embodiment of this application. As shown in FIG. 5B, a vehicle includes a plurality of components and a vehicle body status system, and the plurality of components include a plurality of parts and a plurality of sensors. After the vehicle is started, most components may start to work. Components that start to work may generate driving data. The vehicle body status system may obtain the driving data generated by the components, and transmit the driving data generated by the components to a cloud server. The cloud server stores the driving data. When the driving recorder needs to obtain historical driving data, the driving recorder may request to obtain the historical driving data from the cloud server.

It should be noted that FIG. 5A and FIG. 5B merely show examples of manners in which the driving recorder obtains the historical driving data, and do not constitute a limitation.

S303: Process the historical driving data by using the first model, to obtain a first historical driving feature.

The historical driving data includes a plurality of types of historical driving data. For example, types of the historical driving data include a speed, an acceleration, an engine rotation speed, or an engine temperature.

The first historical driving feature includes driving features corresponding to the plurality of types of historical driving data. For example, the first historical driving feature includes a driving feature corresponding to a historical speed, a driving feature corresponding to a historical acceleration, or a driving feature corresponding to a historical engine rotation speed. The driving feature corresponding to the historical speed is used to indicate a distribution rule of the historical speed, and the driving feature corresponding to the historical acceleration is used to indicate a distribution rule of the historical acceleration.

For one vehicle, the vehicle is usually driven by one or more fixed users. For any user, a driving habit of the user is usually fixed, so that driving data of the vehicle is usually distributed as a fixed curve. For example, for a same user and a same vehicle, speeds at which the user drives the vehicle in different road conditions are usually distributed as a fixed speed curve, and accelerations at which the user drives the vehicle in different road conditions are usually distributed as a fixed acceleration curve. Therefore, the first historical driving feature determined based on the historical driving data may represent a driving habit of the user, or the first historical driving feature may also be referred to as a user profile of the user who drives the vehicle.

The historical driving data may be input to the first model, and the first model outputs the first historical driving feature corresponding to the historical driving data. The first historical driving feature includes a plurality of historical data curves corresponding to various types of historical driving data. The historical data curves each are used to indicate a distribution rule of the historical driving data. That is, the historical data curves each are used to represent the driving feature corresponding to the historical driving data.

Figure 6:
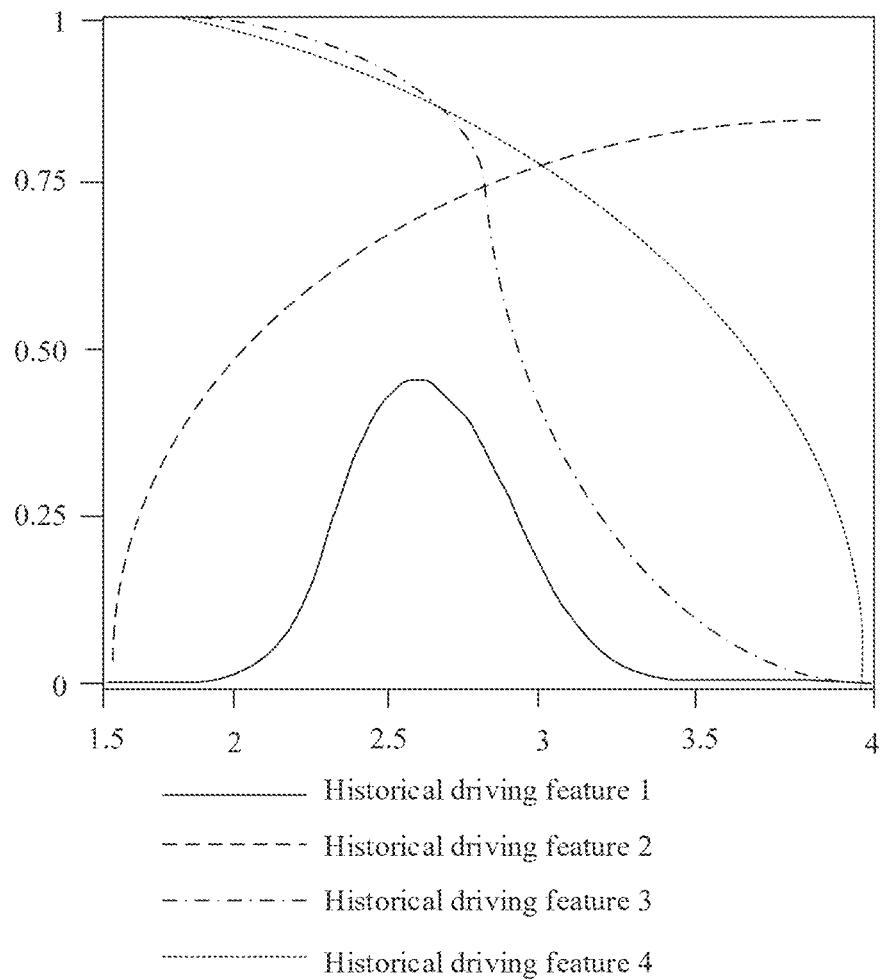
FIG. 6 is a schematic diagram of a historical driving feature according to an embodiment of this application.

The following describes the first historical driving feature with reference to FIG. 6.

FIG. 6 is a schematic diagram of a historical driving feature according to an embodiment of this application. As shown in FIG. 6, there are a plurality of curves in a coordinate system, each curve represents one historical driving feature, and one historical driving feature corresponds to one type of historical driving data. It should be noted that, for different curves, meanings represented by a horizontal axis and a vertical axis are different. For example, when a historical driving feature corresponds to an acceleration, the horizontal axis may represent a road condition index, and the vertical axis may represent an acceleration. When a historical driving feature corresponds to a speed, the horizontal axis may represent a road condition index, and the vertical axis may represent a speed.

FIG. 6 merely shows an example of the first historical driving feature, and does not constitute a limitation on the first historical driving feature.

S304: Obtain a second model.

The second model is used to obtain a similarity between data and a driving feature. The data may include driving data, or the data may include driving data and scenario data.

Optionally, the second model may be obtained in the following manners.

First manner: A device other than a driving recorder generates a second model, and the driving recorder obtains the second model from the device.

Optionally, the device may be a server, a terminal device, or the like.

The device may generate the second model in the following manner: obtaining a plurality of groups of second samples, and learning the plurality of groups of second samples to obtain the second model. Each group of second samples includes sample data, a sample driving feature, and a sample similarity.

Optionally, the sample data may include sample driving data, or the sample data may include sample driving data and sample scenario data. The sample scenario data includes at least one of the following information: sample time information, sample location information, sample road condition information, or sample weather information.

The sample similarity may be a similarity between the sample data and the sample driving feature, and the sample similarity may be a manually annotated similarity.

Optionally, the sample driving data in one group of second samples may be one type of driving data. The type of the driving data may be a speed, an acceleration, a transmitter rotation speed, an engine temperature, or the like. For example, the sample driving data in one group of first samples may be a speed in a preset time period. In one group of sample data, the sample driving feature corresponds to the sample driving data. Optionally, the sample driving feature may be represented by using a sample curve.

Algorithms for learning the second model may include: a logistic regression algorithm, a decision tree algorithm, a vector machine algorithm, a naïve Bayes algorithm, and the like.

After the second model is obtained by learning the plurality of groups of second samples, the second model has the following function: After data and a driving feature are input to the second model, the second model may process the input data and the driving feature, to obtain a similarity between the data and the driving feature.

After the device other than the driving recorder obtains the second model through learning, the driving recorder may obtain the second model from the device. The second model may be an offline model.

Second manner: A driving recorder generates a second model.

It should be noted that, for a process in which the driving recorder generates the second model, refer to the first manner. Details are not described herein again.

Optionally, the second model and the first model may be integrated into one model. For example, a model obtained through integration may simultaneously have functions of the first model and functions of the second model. Alternatively, the second model and the first model may be two independent models.

It should be noted that, the process from S301 to S304 may be a one-time execution process or a periodic execution process. That is, before S305, the process from S301 to S304 only needs to be performed once, but does not need to be performed in real time.

S305: Obtain first data.

Optionally, the first data includes first driving data of the vehicle in a first time period. Alternatively, the first data may include the first driving data and the scenario data, and the scenario data includes at least one of the following information: time information, location information, road condition information, or weather information.

The first time period may be a time period before a current moment and closest to the current moment. For example, the first time period may be 5 minutes, 10 minutes, 30 minutes, 1 hour, or the like before the current moment.

It should be noted that, for a manner of obtaining the first data by the driving recorder, refer to the manner of obtaining the historical driving data by the driving recorder in S302. Details are not described herein again.

S306: Process the first data and the first historical driving feature by using the second model, to obtain a similarity between the first data and the first historical driving feature.

The first data and the first historical driving feature may be input to the second model, so that the second model outputs the similarity between the first data and the first historical driving feature. For example, after the first data and the first historical driving feature are input to the second model, the second model may first determine a first data curve corresponding to the first data, and then compare the first data curve with a historical data curve in the first historical driving feature, to obtain the similarity. If the first data further includes the scenario data, a historical data curve corresponding to the scenario data may be further obtained from the first historical driving feature, and then the first data curve and the historical data curve corresponding to the scenario data may be compared to obtain the similarity.

Optionally, the first data may include the first driving data, or the first data may include the first driving data and the scenario data. When content included in the first data is different, a process of determining the similarity between the first data and the first historical driving feature is accordingly different. The following two cases may be included.

Case 1: The first data includes the first driving data.

The first driving data may include a plurality of types of driving data, and the first historical driving feature includes a historical driving feature corresponding to each type of driving data. A similarity between each type of driving data and a corresponding historical driving feature may be separately obtained, and then the similarity between the first data and the first historical driving feature is determined based on the similarity between each type of driving data and the corresponding historical driving feature.

For any type of driving data, a first data curve corresponding to the type of driving data may be obtained, a historical data curve corresponding to the type of driving data is obtained from the first historical driving feature, and then a similarity between the first data curve and the corresponding historical data curve is determined as the similarity between this type of driving data and the corresponding historical driving feature.

Figure 7A:
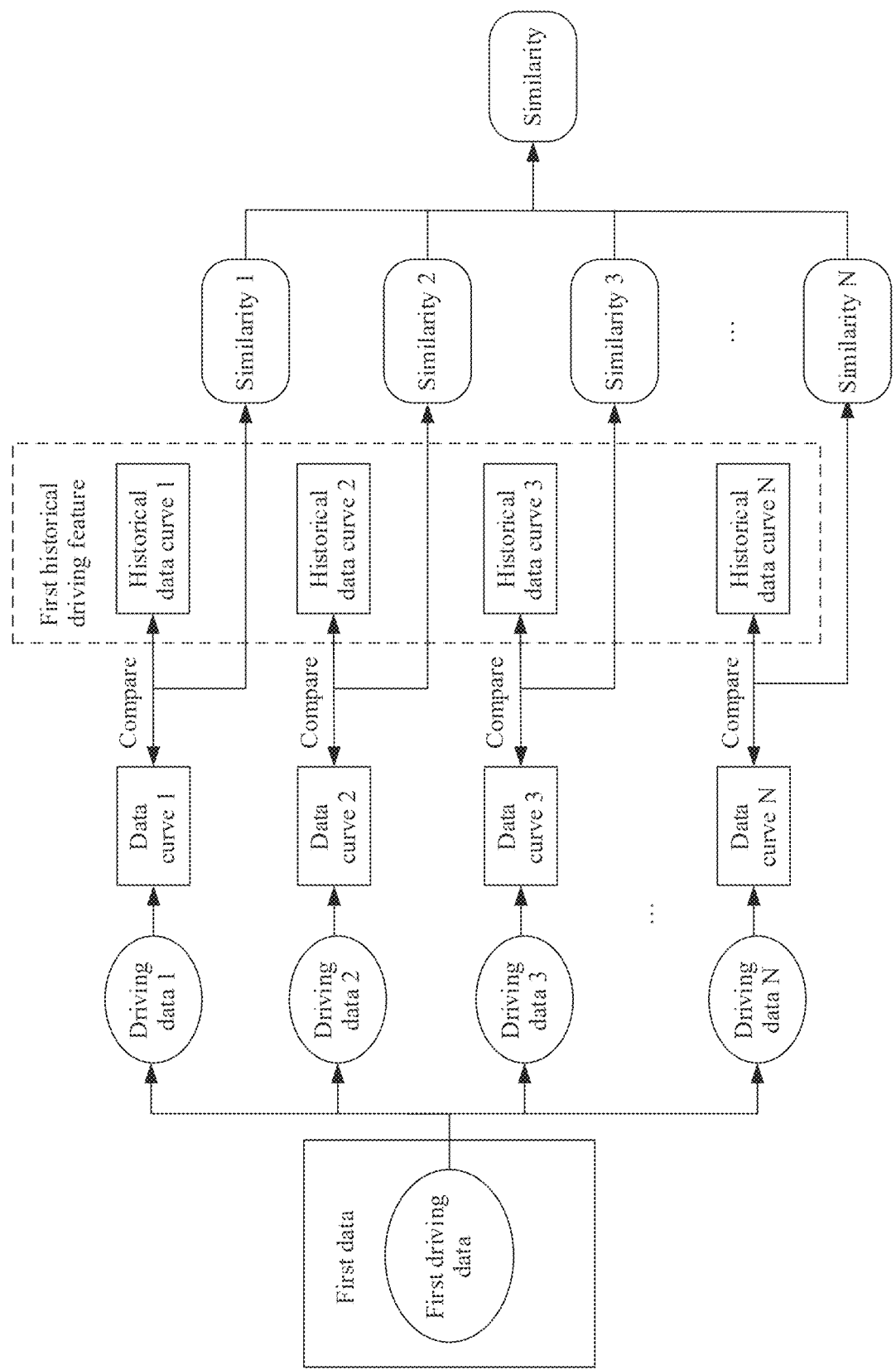
FIG. 7A is a schematic diagram of determining a similarity according to an embodiment of this application.

The following describes a process of determining the similarity between the first data and the first historical driving feature with reference to FIG. 7A.

FIG. 7A is a schematic diagram of determining a similarity according to an embodiment of this application. As shown in FIG. 7A, the first data includes the first driving data. The first driving data may include a plurality of types of driving data. Driving data 1, driving data 2, driving data 3, . . . , and driving data N (N is an integer greater than 1) are N different types of driving data. For example, the driving data 1 may be a speed, the driving data 2 may be an acceleration, and the driving data 3 may be an engine rotation speed.

A data curve corresponding to each type of driving data may be obtained. Optionally, a data curve corresponding to each type of driving data may be obtained by using the second model. For example, the driving data 1 may be input to the second model, so that the second model outputs a data curve 1 corresponding to the driving data 1. The driving data 2 may be input to the second model, so that the second model outputs a data curve 2 corresponding to the driving data 2. By analogy, N data curves corresponding to the N types of driving data may be obtained.

A first historical driving feature includes a plurality of historical data curves. For example, the first historical driving feature includes a historical data curve 1 corresponding to the driving data 1 and a historical data curve 2 corresponding to the driving data 2. The data curve 1 and the historical data curve 1 may be compared to obtain a similarity 1, the data curve 2 and the historical data curve 2 may be compared to obtain a similarity 2, and by analogy. N similarities may be obtained.

An average value or a weighted average value of the N similarities may be determined as the similarity between the first data and the first historical driving feature.

Case 2: The first data includes the first driving data and the scenario data.

The first driving data may include a plurality of types of driving data. For example, the first driving data may include a speed, an acceleration, and an engine rotation speed. The scenario data includes at least one of the following information: time information, location information, road condition information, or weather information. A corresponding scenario type may be determined and obtained based on the scenario data. For example, the scenario type may include rainy weather, a morning rush hour, an evening rush hour, a holiday, a workday, and an unblocked road condition.

The first historical driving feature includes a plurality of historical driving features corresponding to each type of driving data, and the plurality of historical driving features correspond to different scenario types. For example, it is assumed that the driving data is a speed, the first historical driving feature includes a plurality of historical speed driving features corresponding to the speed, and the plurality of historical speed driving features may include: a historical speed driving feature corresponding to rainy weather, a historical speed driving feature corresponding to a morning rush hour, a historical speed driving feature corresponding to a holiday, and the like.

A similarity between each type of driving data and a corresponding historical driving feature may be separately obtained based on the scenario data, and then the similarity between the first data and the first historical driving feature is determined based on the similarity between each type of driving data and the corresponding historical driving feature.

For any type of driving data, a first data curve corresponding to the type of driving data may be obtained. A plurality of historical data curves corresponding to the type of driving data are obtained from the first historical driving feature. A scenario type is determined based on the scenario data. A first historical data curve corresponding to the scenario type is determined from the plurality of historical data curves. A similarity between the first data curve and the first historical data curve is determined as the similarity between the type of driving data and the historical driving feature.

Figure 7B:
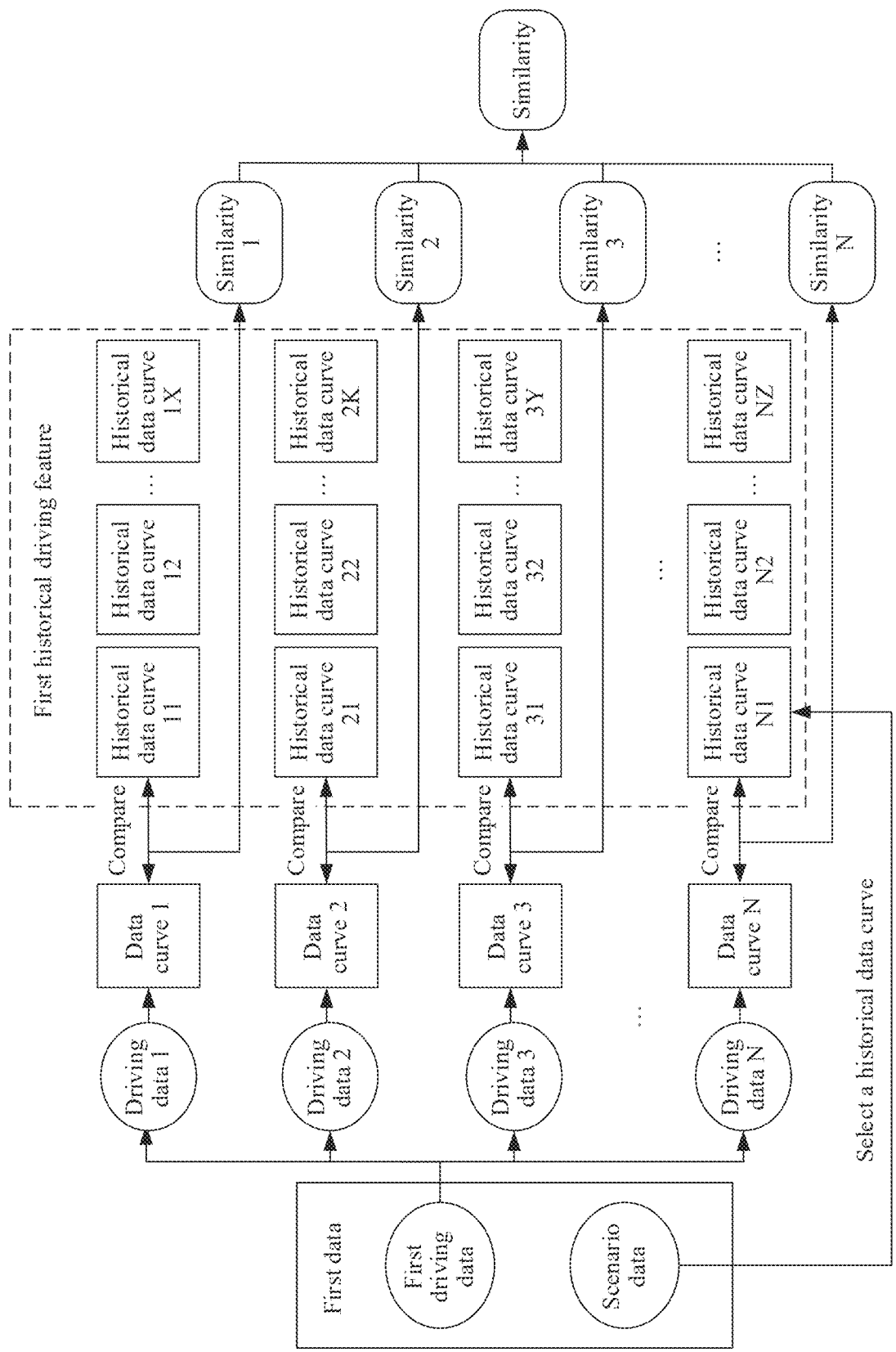
FIG. 7B is a schematic diagram of determining a similarity according to an embodiment of this application.

The following describes a process of determining the similarity between the first data and the first historical driving feature with reference to FIG. 7B.

FIG. 7B is a schematic diagram of determining a similarity according to an embodiment of this application. As shown in FIG. 7B, the first data includes the first driving data and the scenario data. The first driving data may include a plurality of types of driving data. Driving data 1, driving data 2, driving data 3 . . . and driving data N (N is an integer greater than 1) are N different types of driving data. For example, the driving data 1 may be a speed, the driving data 2 may be an acceleration, and the driving data 3 may be an engine rotation speed.

A data curve corresponding to each type of driving data may be obtained. Optionally, a data curve corresponding to each type of driving data may be obtained by using the second model. For example, the driving data 1 may be input to the second model, so that the second model outputs a data curve 1 corresponding to the driving data 1. The driving data 2 may be input to the second model, so that the second model outputs a data curve 2 corresponding to the driving data 2. By analogy, N data curves corresponding to the N types of driving data may be obtained.

A first historical driving feature includes a plurality of historical data curves corresponding to each type of driving data. For example, the first historical driving feature includes a plurality of historical data curves (for example, a historical data curve 11, a historical data curve 12, . . . , and a historical data curve 1X) corresponding to the driving data 1, a plurality of historical data curves (for example, a historical data curve 21, a historical data curve 22, . . . a historical data curve 2K) corresponding to the driving data 2, and the like. A first historical data curve (assumed to be a historical data curve 11) corresponding to the scenario data may be selected, based on the scenario data, from the plurality of historical data curves corresponding to the driving data 1, and a first historical data curve (assumed to be a historical data curve 21) corresponding to the scenario data may be selected, based on the scenario data, from the plurality of historical data curves corresponding to the driving data 2. By analogy, a first historical data curve corresponding to each type of driving data are selected based on the scenario data. The data curve 1 and the historical data curve 1 may be compared to obtain a similarity 1, the data curve 2 and the historical data curve 2 may be compared to obtain a similarity 2, and by analogy. N similarities may be obtained.

An average value or a weighted average value of the N similarities may be determined as the similarity between the first data and the first historical driving feature.

It should be noted that FIG. 7A and FIG. 7B merely show an example of determining the similarity between the first data and the first historical driving feature, and do not constitute a limitation thereto. The similarity may be determined in another manner.

It should be noted that the similarity between the first data and the first historical driving feature may be further obtained according to an algorithm. A process of obtaining the similarity according to an algorithm is similar to the process of obtaining the similarity by using the second model. Details are not described herein again.

S307: Determine, based on the similarity, that the vehicle is abnormal in the first time period.

A case in which the vehicle is abnormal in the first time period may include: the vehicle is faulty in the first time period, a vehicle accident occurs to the vehicle in the first time period, or the user drives the vehicle abnormally in the first time period. That the user drives the vehicle abnormally may include: the user drives extremely fast, the user drives extremely slow, the user drive the vehicle to loiter in an area, or the like.

Optionally, if the similarity is less than or equal to a similarity threshold, it is determined that the vehicle is abnormal in the first time period.

S308: Annotate a driving record video of the vehicle based on the first time period.

The driving record video of the vehicle may be annotated in the following manner: generating abnormality information; and annotating the abnormality information in the driving record video based on the first time period.

The abnormality information includes at least one of the following information: an abnormality indication, an abnormality level, an abnormality type, or abnormality description information. The abnormality indication is used to indicate that the vehicle is abnormal. The abnormality level is used to indicate an abnormality degree of the vehicle. For example, a lower similarity determined in S306 indicates a higher abnormality degree of the vehicle and a higher abnormality level. The abnormality type may include an abnormal brake, an abnormal turn, an abnormal acceleration, an abnormal engine, an abnormal driving track, and the like. The abnormality description information is used to describe a specific condition of a vehicle abnormality. For example, the abnormality description information may include: 5 abrupt brakes within one minute, an acceleration greater than a first threshold, 10 round-trip drives in a same road section within one hour, or 10 lane changes within three minutes.

After the driving record video is annotated, the user may view the annotated driving record video by using a terminal device (like a computer or a mobile phone). The following describes a process in which the driving record video is annotated and the user views the annotated driving record video.

First Video Annotation Manner:

An image shooting device may shoot a plurality of driving record videos of the vehicle. For example, one trip of the vehicle (from the time when the vehicle is started to the time when the vehicle is stalled) may correspond to one driving record video, or one piece of preset driving duration (for example, one hour) of the vehicle may correspond to one driving record video. A plurality of driving record videos of the vehicle for a plurality of trips may be stored in a list. When the driving record videos are annotated, abnormality information is generated, and the abnormality information is used as attribute information of the driving record videos. In this way, when the driving record videos are displayed in a list, the abnormality information may be displayed. Some information (for example, the abnormality description information or some content in the abnormality description information) in the abnormality information may be further added to corresponding locations in the driving record videos as subtitles or pop-ups.

Figure 8A:
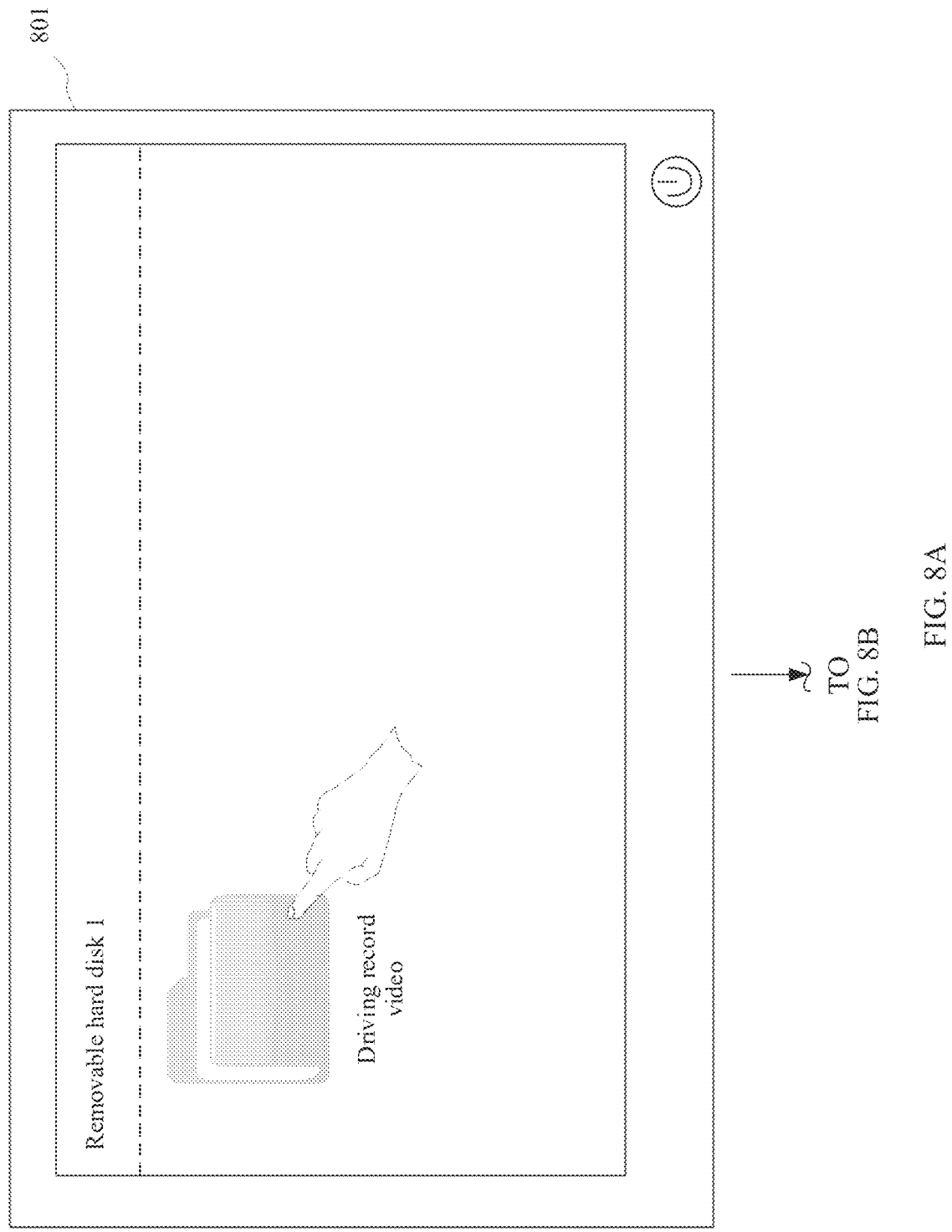

In this video annotation manner, the following describes, with reference to FIG. 8A to FIG. 8C, a manner in which the user views annotated driving record videos.

FIG. 8A to FIG. 8C are schematic diagrams of a video viewing manner according to an embodiment of this application. As shown in FIG. 8A to FIG. 8C, there are an interface 801 to an interface 803.

Refer to the interface 801, it is assumed that a manner in which the terminal device obtains the driving record videos is shown in FIG. 2A, after the terminal device obtains the driving record videos, the terminal device may display a folder corresponding to the driving record videos. When the user needs to view the driving record videos, the user may tap the folder corresponding to the driving record videos to display a driving record video list on the terminal device.

As shown in the interface 802, there is a driving record video list. The list includes five driving record videos and attribute information of the five driving record videos. The attribute information includes a shooting time, an abnormality indication, an abnormality level, an abnormality type, and abnormality description information. Certainly, the attribute information may further include other information. This is not limited thereto. The five driving record videos may be videos corresponding to five trips of the vehicle. It can be learned from the driving record video list that, in time periods corresponding to a driving record video 1, a driving record video 4, and a driving record video 5, the vehicle is normal, and abnormality indications corresponding to the three driving record videos are "normal". In time periods corresponding to a driving record video 2 and a driving record video 3, the vehicle is abnormal, and abnormality indications corresponding to the two driving record videos are "abnormal". The two driving record videos further have attributes: abnormality levels, abnormality types, and abnormality description information. Optionally, the abnormality description information may be brief description information, and the user may tap the brief description information to display detailed description information on the terminal device. For example, after the user taps the brief description information of "frequent brakes", the terminal device may display detailed description information of "8 sudden brakes between a $20^{th}$ minute and a $22^{nd}$ minute". Optionally, to facilitate the user to view an "abnormal" driving record video, identifiers and attribute information of "normal" and "abnormal" driving record videos may be displayed in different display manners, where the display manners include a font color, a font type, a font size, and the like. For example, an identifier and attribute information of a "normal" driving record video may be displayed in red font, and an identifier and attribute information of an "abnormal" driving record video may be displayed in black font. The user may tap an identifier of a driving record video in the driving record video list to play the driving record video on the terminal device. For example, when the user needs to view the driving record video 2, the user may tap an identifier of the driving record video 2 to play the driving record video 2 on the terminal device.

As shown in the interface 803, the terminal device plays the driving record video 2. The user may determine, based on abnormality description information of the driving record video 2, that the vehicle is abnormal between the $20^{th}$ minute and the $22^{nd}$ minute of the driving record video 2, and the user may drag a video play progress bar based on the abnormality description information. When the user drags the progress bar to the $20^{th}$ minute, partial content (an abrupt brake) of the abnormality description information is displayed as subtitles in the video.

In the foregoing process, the user may conveniently obtain the driving record video corresponding to an abnormality in the vehicle based on the driving record video list, learn the time period when the vehicle is abnormal in the driving record video based on the abnormality description information, and accurately locate the time period in the driving record video. These operations are convenient and flexible to improve user experience.

It should be noted that the driving record video may alternatively be a video of preset duration. For example, duration of each driving record video is one hour. Optionally, the driving record video whose abnormality indication is "abnormal" may alternatively be a video shot in a time period in which the vehicle encounters an abnormality. For example, duration of the driving record video 2 may be two minutes, and the vehicle encounters an abnormality within the two minutes.

Second Video Annotation Manner:

One driving record video shot by an image shooting device may correspond to one video file. If a vehicle becomes abnormal in a shooting time period of the driving record video, an abnormality information file is generated. The abnormality information file may include one or more pieces of abnormality information, and the abnormality information file may be used as a configuration file of the video file. One piece of abnormality information in the abnormality information file may correspond to one abnormality time period (or abnormality moment) in the driving record video, and there is an association between the abnormality information and the abnormality time period (or abnormality moment) in the driving record video. For example, the corresponding abnormality time period (or abnormality moment) may be located based on the abnormality information.

Figure 9:
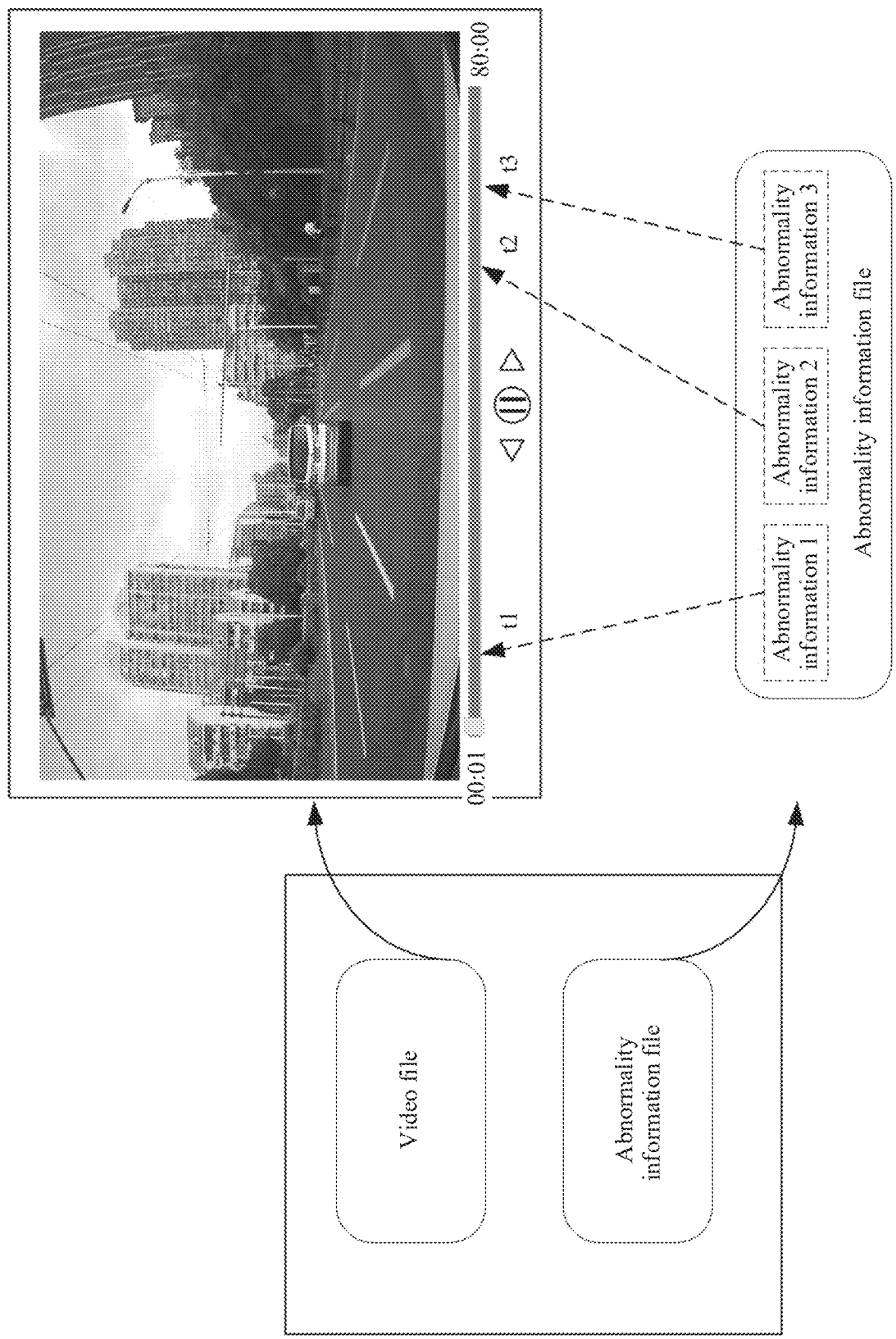
FIG. 9 is a schematic diagram of a video annotation manner according to an embodiment of this application.
Figure 10A:
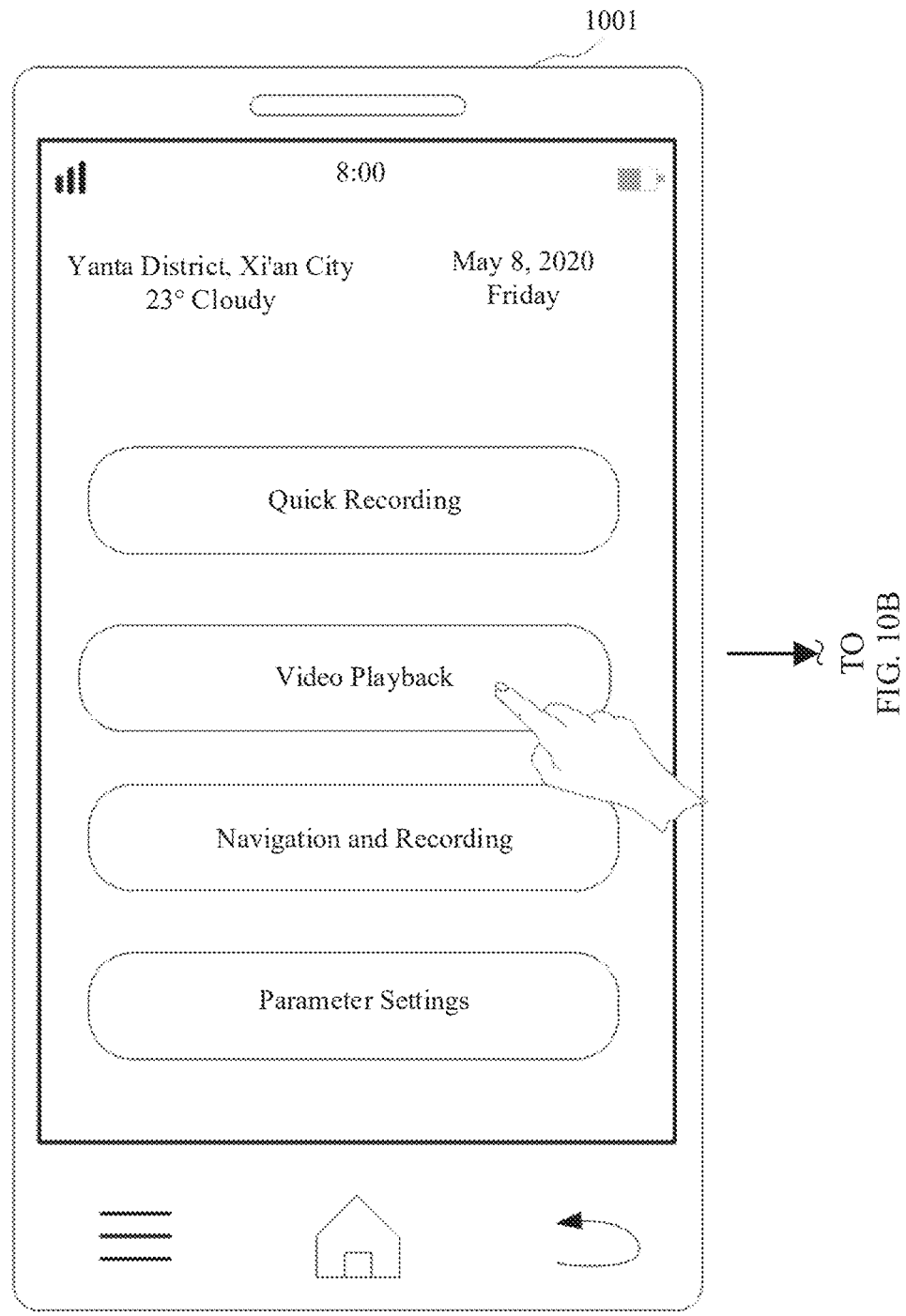
FIG. 10A to FIG. 10F are schematic diagrams of a video viewing manner according to an embodiment of this application.
Figure 10B:
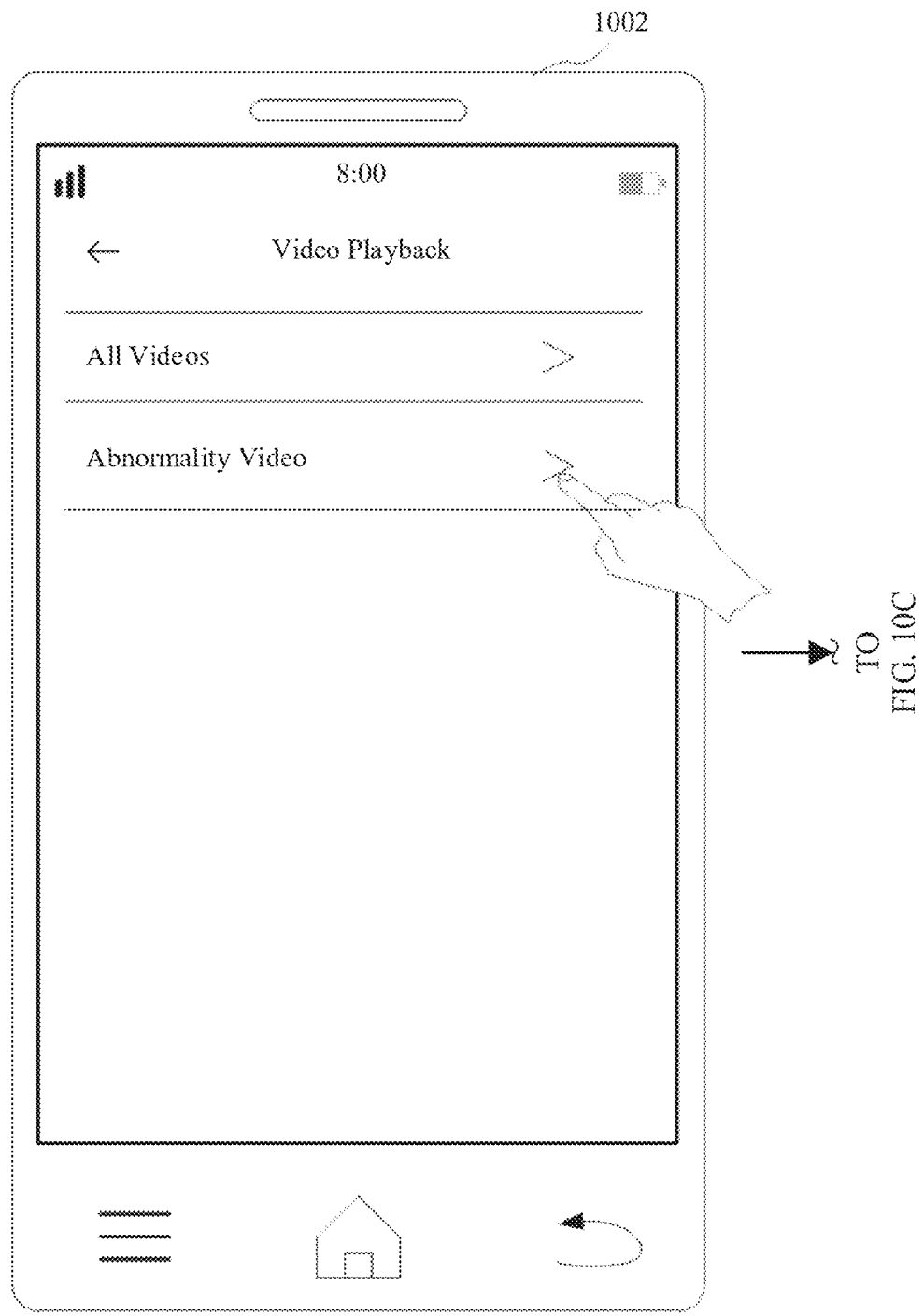
Figure 10C:
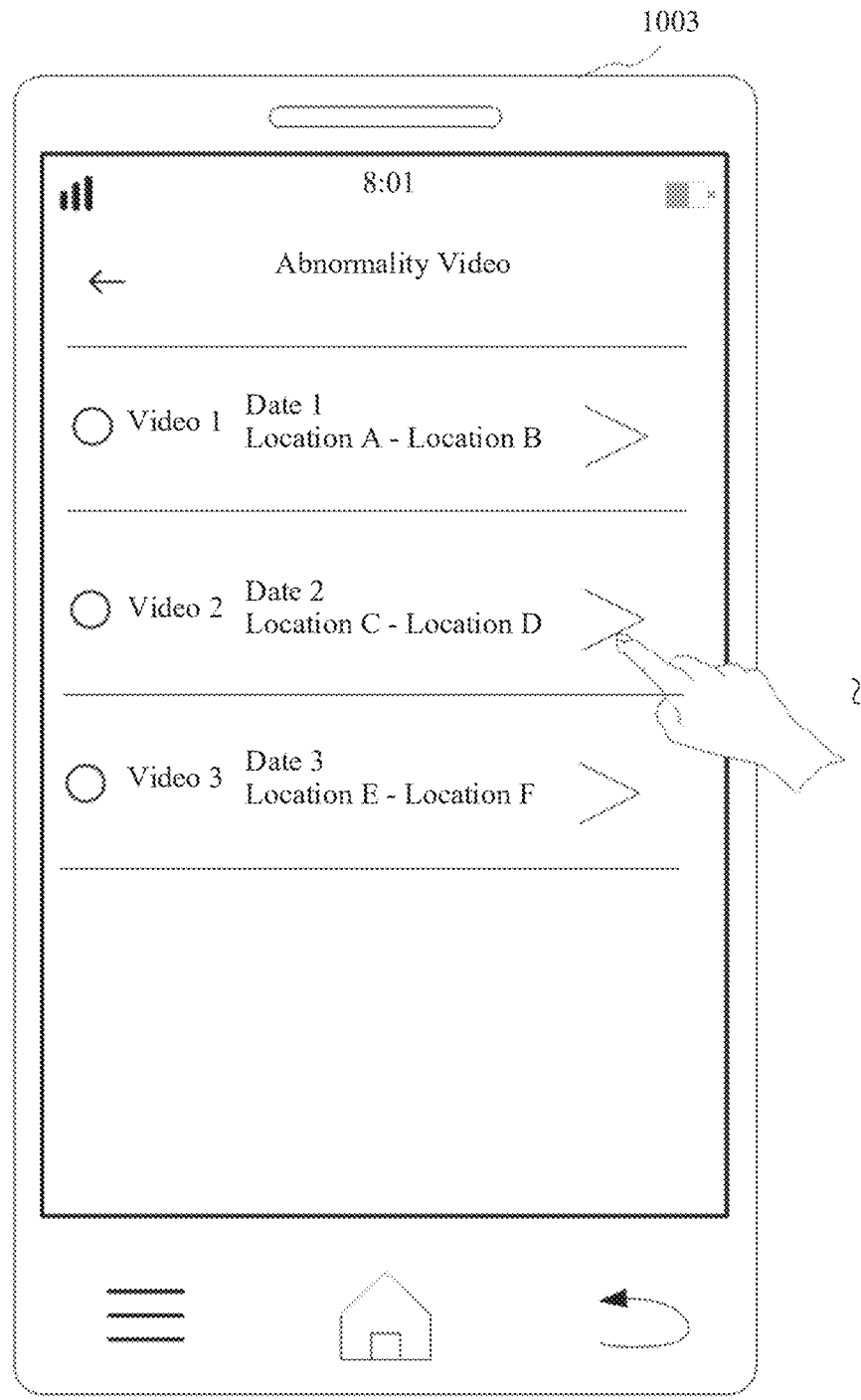
Figure 10D:
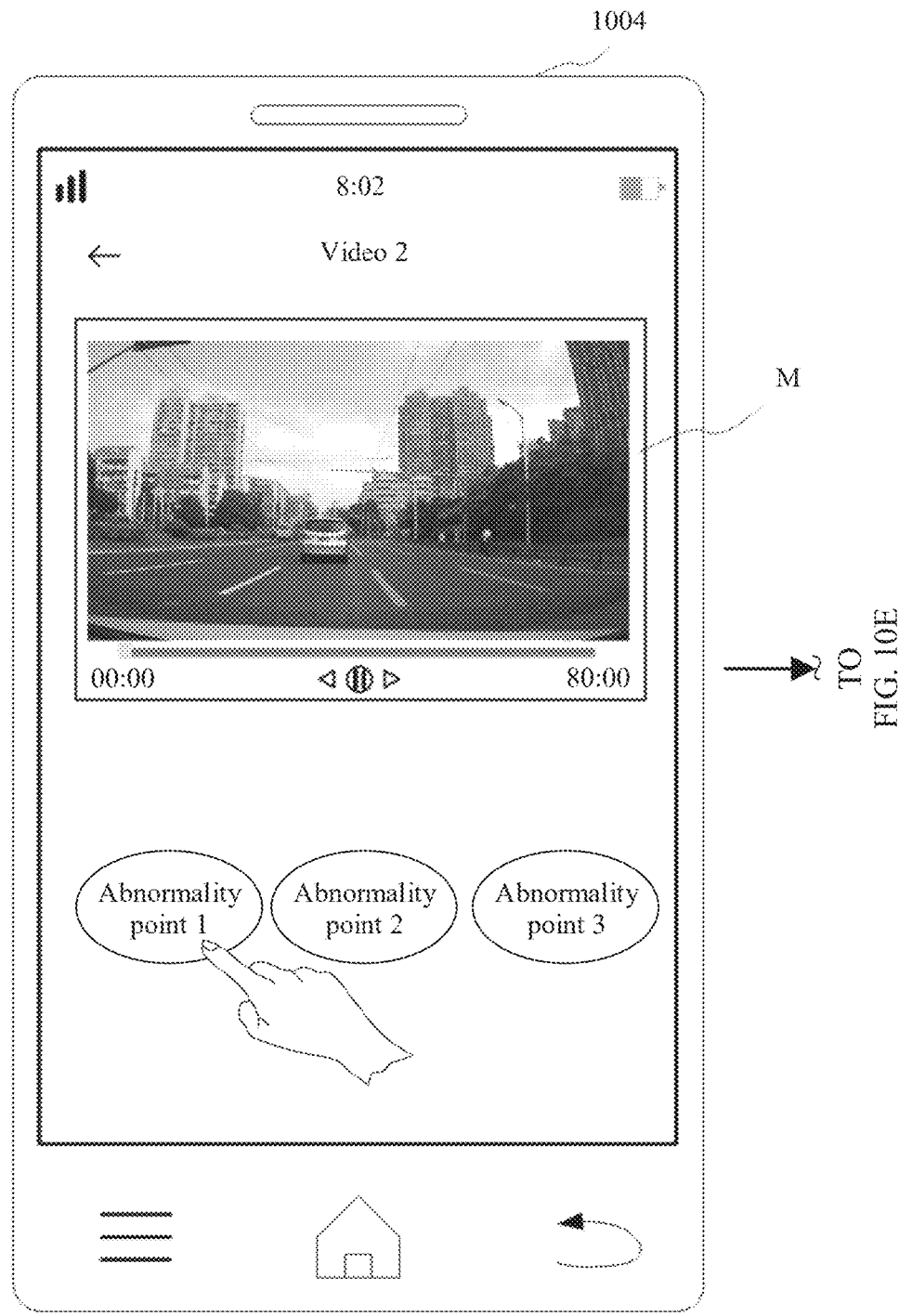
Figure 10E:
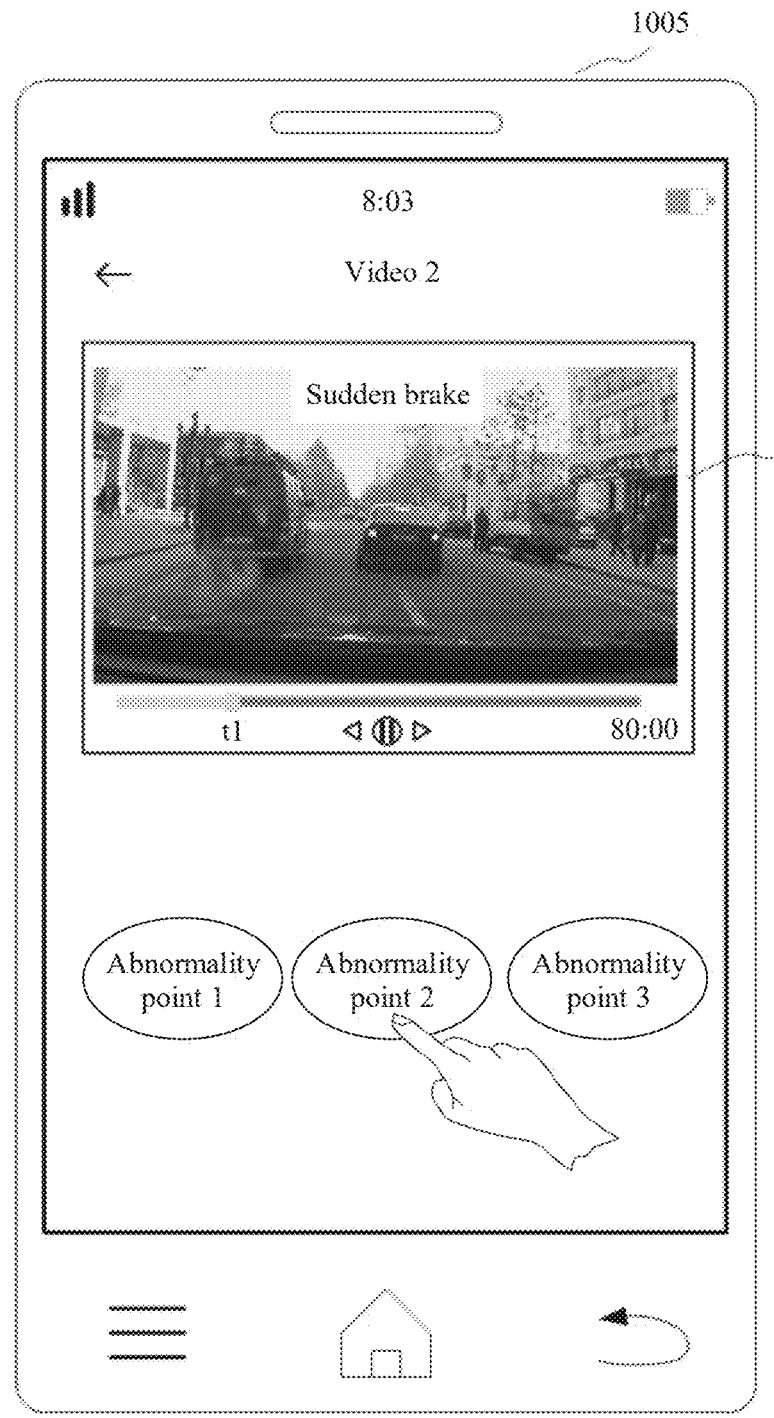
Figure 10F:
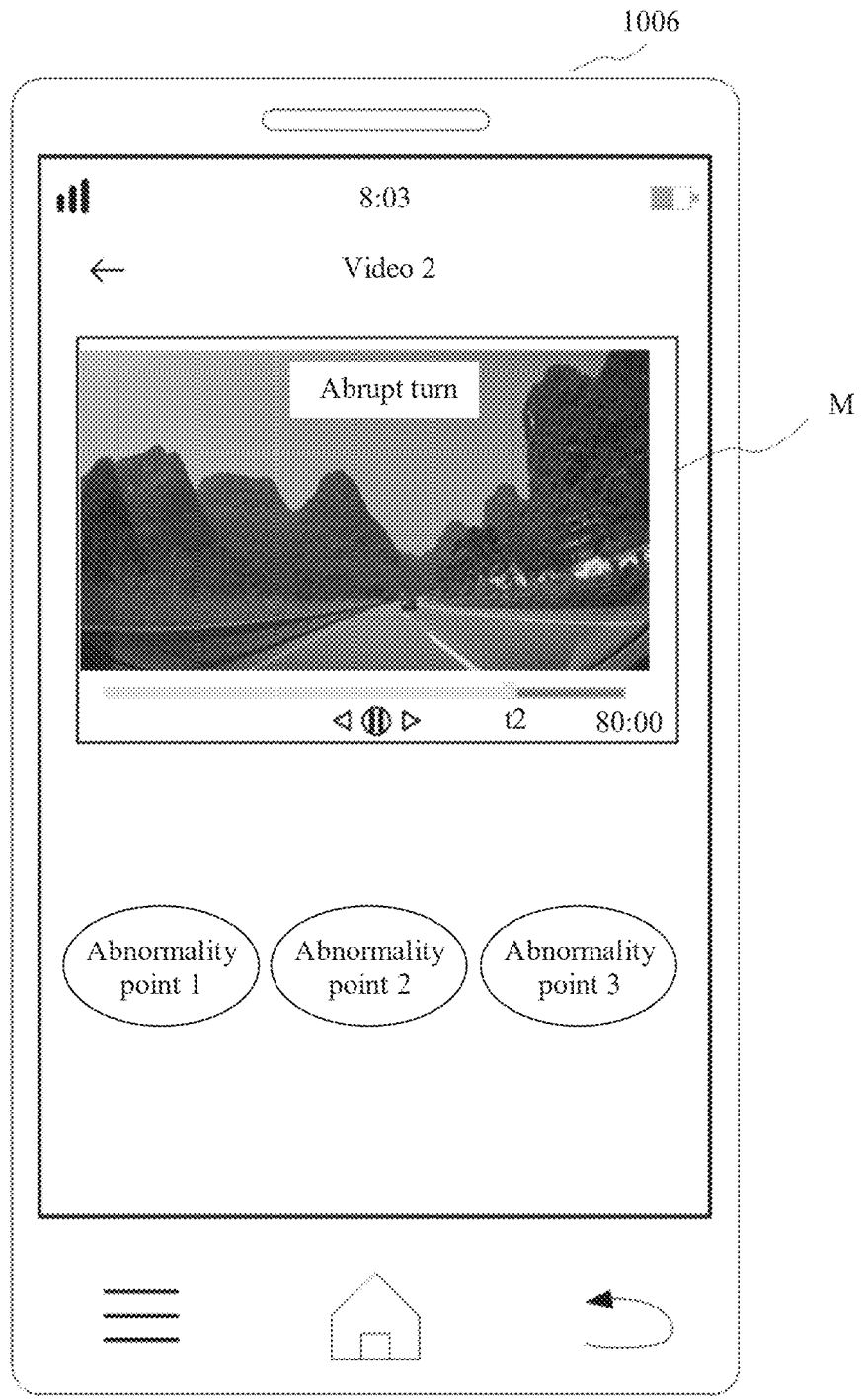

With reference to FIG. 9, the following describes a process of annotating a driving record video.

FIG. 9 is a schematic diagram of a video annotation manner according to an embodiment of this application. As shown in FIG. 9, when a vehicle is abnormal in a shooting time period corresponding to a driving record video, a video file and an abnormality information file may be generated. For example, the video file may be a video of 80 minutes, and the abnormality information file may include three pieces of abnormality information, which are respectively abnormality information 1, abnormality information 2, and abnormality information 3. The abnormality information 1 corresponds to a moment t1 in the driving record video, that is, the moment t1 in the driving record video may be located based on the abnormality information 1. The abnormality information 2 corresponds to a moment t2 in the driving record video, that is, the moment t2 in the driving record video may be located based on the abnormality information 2. The abnormality information 13 corresponds to a moment t3 in the driving record video, that is, the moment t3 in the driving record video may be located based on the abnormality information 3.

In this video annotation manner, the following describes, with reference to FIG. 10A to FIG. 10F, a manner in which the user views an annotated driving record video.

FIG. 10A to FIG. 10F are a schematic diagrams of a video viewing manner according to an embodiment of this application. As shown in FIG. 10A to FIG. 10F, interfaces 1001 to 1006 are included.

As shown in the interface 1001, it is assumed that a manner in which the terminal device obtains a driving record video is shown in FIG. 2B or FIG. 2C. An application is installed in the terminal device. It is assumed that the driving record video is transmitted to the terminal device by using the application. When the user needs to view the driving record video by using the terminal device, the user may start the application on the terminal device. The application includes a "Video Playback" icon. The user may tap the icon to display the interface 1002 on the terminal device. The interface 1001 may further include another icon. The icon included in the interface 1001 is not specifically limited in this embodiment of this application.

As shown in the interface 1002, there are an "All Videos" icon and an "Abnormality Video" icon. A page corresponding to the "All Videos" icon includes identifiers of all videos, and a page corresponding to the "Abnormality Video" icon includes an identifier of an abnormality video. When the user needs to view an abnormality video, the user may tap the "Abnormality Video" icon to display the interface 1003 on the terminal device. The abnormality video is a video whose shooting time period includes a time period in which the vehicle is abnormal.

As shown in the interface 1003, an abnormality video list is included. The user may tap any abnormality video to play the abnormality video on the terminal device. For example, it is assumed that the user needs to view a video 2, the user taps the video 2 to display the interface 1004 on the terminal device.

As shown in the interface 1004, a video playing window M and at least one "Abnormality Point" icon are included. A quantity of the "Abnormality Point" icons is consistent with a quantity of abnormalities in the abnormality video. For example, it is assumed that three abnormalities are included in the video 2, and three "Abnormality Point" icons are accordingly included in the interface: an "Abnormality Point 1" icon, an "Abnormality Point 2" icon, and an "Abnormality Point 3" icon. Optionally, the three "Abnormality Point" icons may be generated based on three pieces of abnormality information in FIG. 9. It is assumed that the user needs to view a video clip corresponding to the abnormality point 1, the user may tap the "Abnormality Pint 1" icon to display the interface 1005 on the terminal device.

As shown in the interface 1005, a play progress bar of the video in the video playing window M jumps to the moment t1, and abnormality description information (an abrupt brake) is displayed in the video. It is assumed that the user needs to view a video clip corresponding to the abnormality point 2, the user may tap the "Abnormality Point 2" icon to display the interface 1006 on the terminal device.

As shown in the interface 1006, the play progress bar of the video in the video playing window M jumps to the moment t2, and abnormality description information (an abrupt turn) is displayed in the video.

In the foregoing process, the user can conveniently view an abnormality video by using an application in the terminal device, and can quickly locate an abnormality time period based on an "Abnormality Point" icon. These operations are convenient and flexible to improve user experience.

According to a data processing method provided in embodiments of this application, first data and a first historical driving feature of a vehicle in a first time period may be obtained, that the vehicle is abnormal in the first time period may be determined based on the first data and the first historical driving feature, and a driving record video of the vehicle may be annotated based on the first time period. The first data may reflect a driving status of the vehicle in the first time period, and the first historical driving feature may reflect a driving habit of a driver of the vehicle. Because the driving habit of the user is usually fixed, whether the vehicle is abnormal in the first time period can be determined by comparing the first driving data and the historical driving feature of the vehicle. When it is determined that the vehicle is abnormal in the first time period, the driving record video shot by an image shooting device may be annotated to record that the vehicle is abnormal in the first time period. In this way, the driving record video can be accurately annotated. The user may accurately and quickly search for a video clip based on an annotation result of the driving record video to improve video clip searching efficiency.

It should be noted that processing steps (S301 to S308) shown in the embodiment in FIG. 3 do not constitute a specific limitation on the data processing process. In some other embodiments of this application, the data processing process may include more or fewer steps than those in the embodiment of FIG. 3. For example, the data processing process may include some steps in the embodiment of FIG. 3, or some steps in the embodiment of FIG. 3 may be replaced by steps having a same function, or some steps in the embodiment of FIG. 3 may be split into a plurality of steps, or the like.

Figure 11:
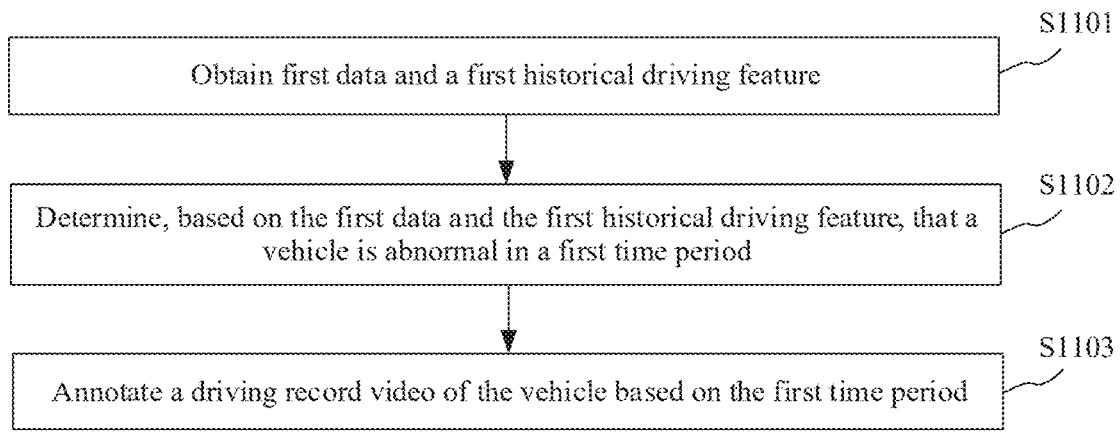
FIG. 11 is a schematic flowchart of another data processing method according to an embodiment of this application.

The following describes another feasible data processing method with reference to FIG. 11.

FIG. 11 is a schematic flowchart of another data processing method according to an embodiment of this application. Refer to FIG. 11. The method may include the following steps.

S1101: Obtain first data and a first historical driving feature.

An execution body for this embodiment of this application may be a vehicle, a driving recorder, or a data processing apparatus disposed in the vehicle or the driving recorder. The data processing apparatus may be implemented by using software, or may be implemented by using a combination of software and hardware. For example, the data processing apparatus may be a processing chip.

The first data includes first driving data of a vehicle in a first time period, and the first historical driving feature is determined based on historical driving data of the vehicle.

It should be noted that for a process of obtaining the first historical driving feature, refer to a process of performing S303. For a process of obtaining the first data, refer to a process of performing S305. Details are not described herein again.

S1102: Determine, based on the first data and the first historical driving feature, that the vehicle is abnormal in the first time period.

It should be noted that for a process of performing S1102, refer to the process of performing S306 and S307. Details are not described herein.

S1103: Annotate a driving record video of the vehicle based on the first time period.

It should be noted that for a process of performing S1103, refer to the process of performing S308. Details are not described herein.

In the embodiment shown in FIG. 11, the first data and the first historical driving feature of the vehicle in the first time period may be obtained, that the vehicle is abnormal in the first time period is determined based on the first data and the first historical driving feature, and the driving record video of the vehicle is annotated based on the first time period. The first data may reflect a driving status of the vehicle in the first time period, and the first historical driving feature may reflect a driving habit of a driver of the vehicle. Because the driving habit of the user is usually fixed, whether the vehicle is abnormal in the first time period can be determined by comparing the first driving data and the historical driving feature of the vehicle. When it is determined that the vehicle is abnormal in the first time period, the driving record video shot by an image shooting device may be annotated to record that the vehicle is abnormal in the first time period. In this way, the driving record video can be accurately annotated. The user may accurately and quickly search for a video clip based on an annotation result of the driving record video to improve video clip searching efficiency.

An embodiment of this application further provides a driving recorder. The following describes the driving recorder with reference to FIG. 12A and FIG. 12B.

Figure 12A:
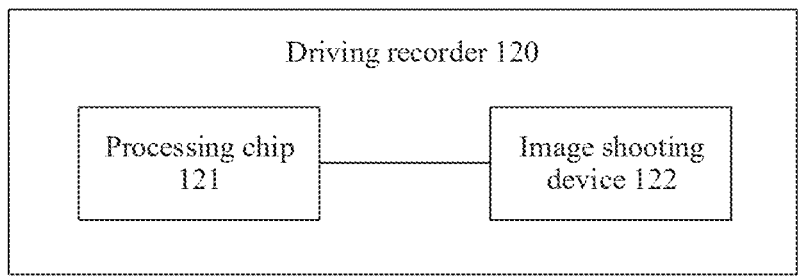
FIG. 12A is a schematic diagram of a structure of a driving recorder according to an embodiment of this application.

FIG. 12A is a schematic diagram of a structure of a driving recorder according to an embodiment of this application. As shown in FIG. 12A, a driving recorder 120 includes a processing chip 121 and an image shooting device 122.

The image shooting device 121 is configured to shoot a driving record video.

The processing chip 122 is configured to: obtain first data and a first historical driving feature: determine, based on the first data and the first historical driving feature, that the vehicle is abnormal in a first time period; and annotate a driving record video based on the first time period. The first data includes first driving data of the vehicle in the first time period, and the first historical driving feature is determined based on historical driving data of the vehicle.

Optionally, the processing chip 122 may further perform the data processing method shown in the foregoing method embodiments. A process and beneficial effects thereof are similar, and details are not described herein again.

Figure 12B:
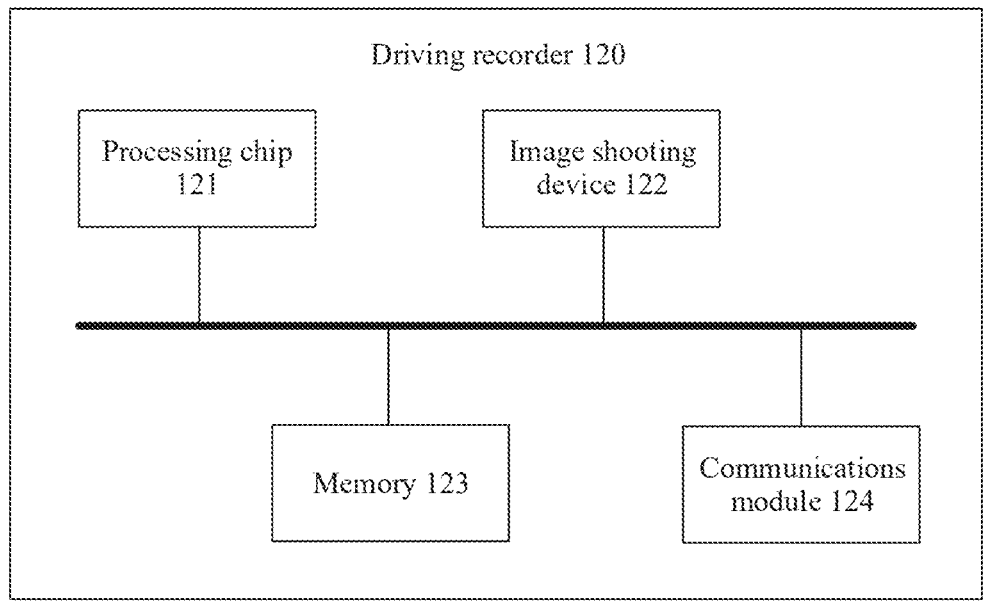
FIG. 12B is a schematic diagram of a structure of another driving recorder according to an embodiment of this application.

FIG. 12B is a schematic diagram of a structure of another driving recorder according to an embodiment of this application. Based on FIG. 12A, as shown in FIG. 12B, a driving recorder 120 may further include a memory 123, and the memory 123 is configured to store a driving record video.

Optionally, after an image shooting device 121 shoots and obtains the driving record video, the driving record video may be sent to the memory 123, to store the driving record video in the memory 123.

Optionally, the memory 123 may further store program instructions, and a processing chip 122 may perform, based on the program instructions, the technical solutions shown in the foregoing method embodiments.

As shown in FIG. 12B, the driving recorder 120 may further include a communications module 124, and the communications module 124 may communicate with another device (for example, a vehicle or a cloud server).

Optionally, the driving recorder 120 may further include a data collection device. The data collection device may include a camera, a millimeter-wave radar, a laser radar, an inertial sensor, or the like. The data collection device may obtain first data.

Figure 13A:
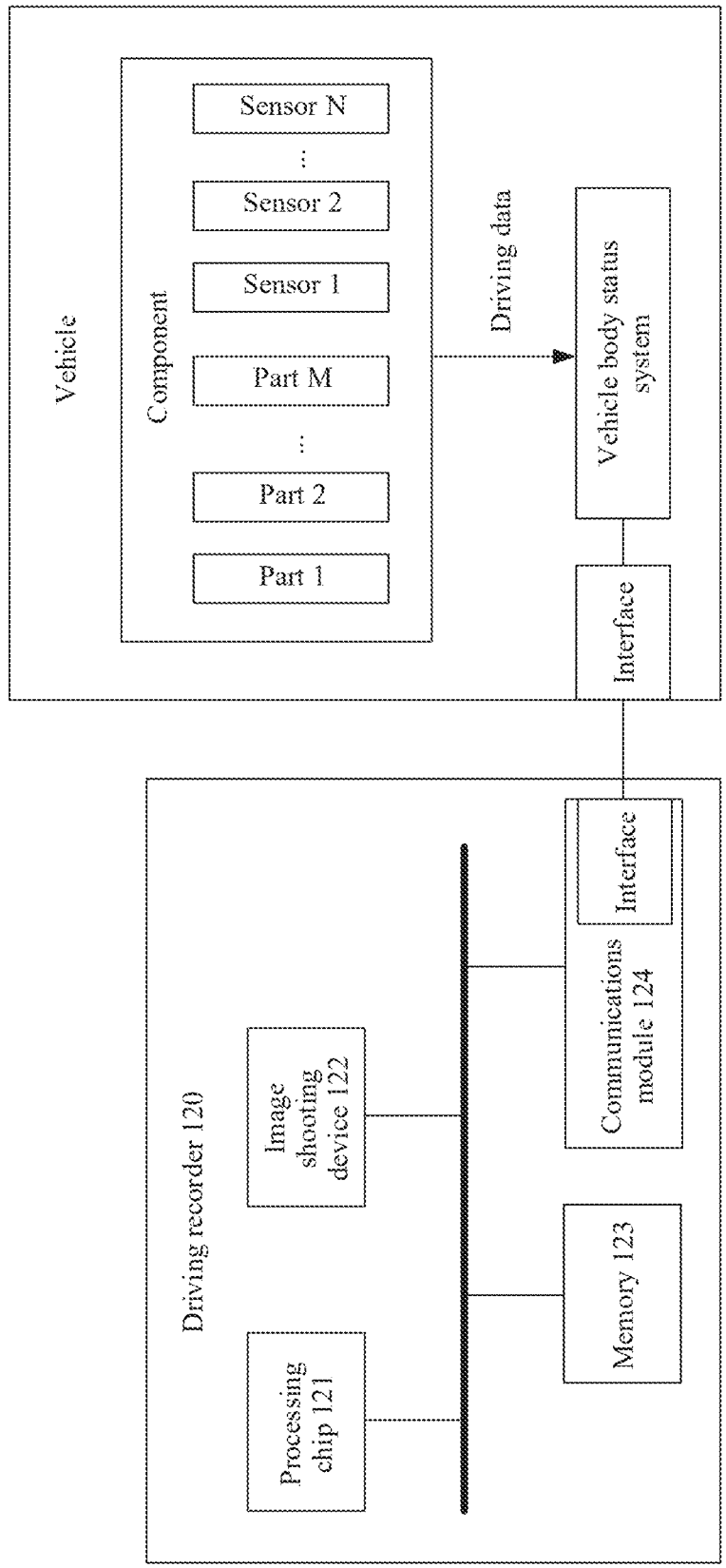
FIG. 13A is a schematic diagram of a device connection according to an embodiment of this application.
Figure 13B:
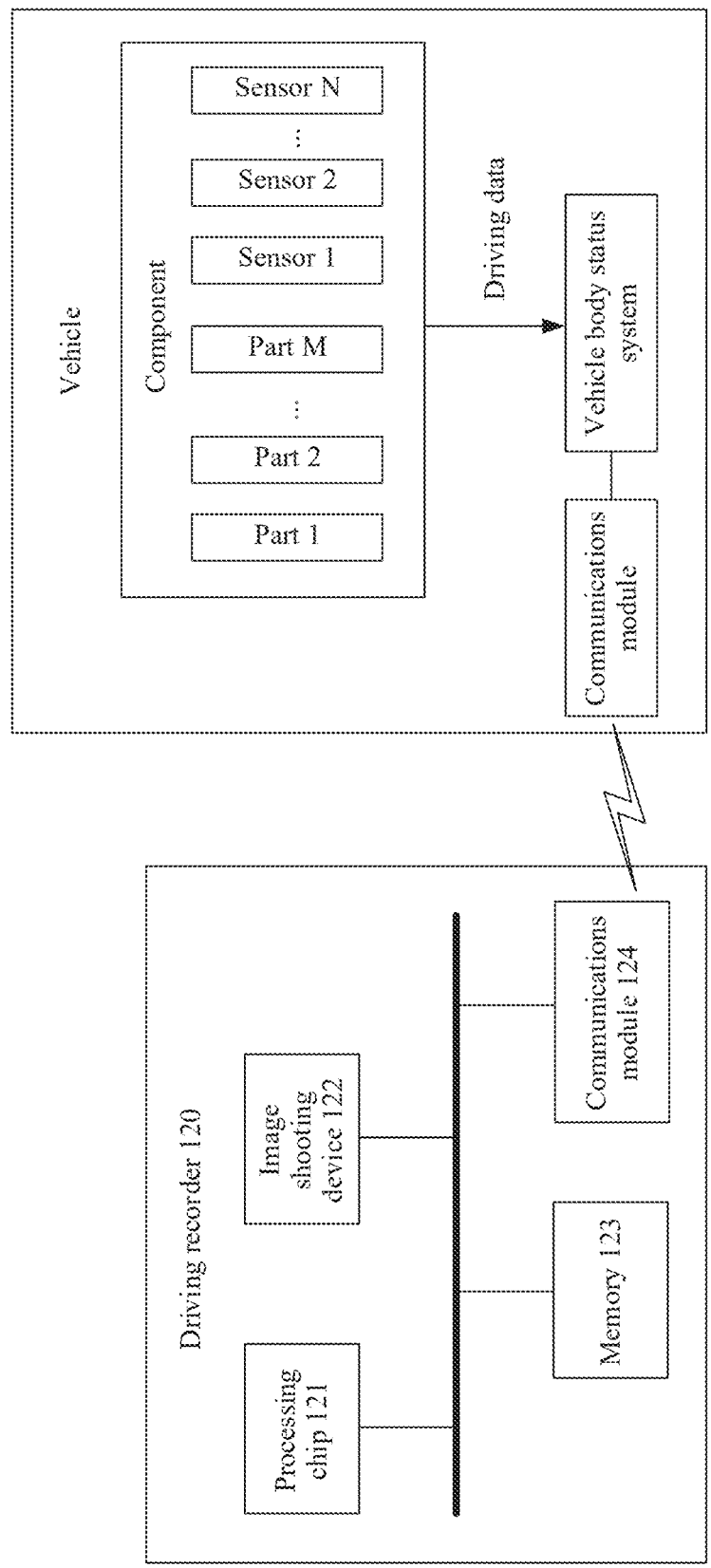
FIG. 13B is a schematic diagram of another device connection according to an embodiment of this application.
Figure 13C:
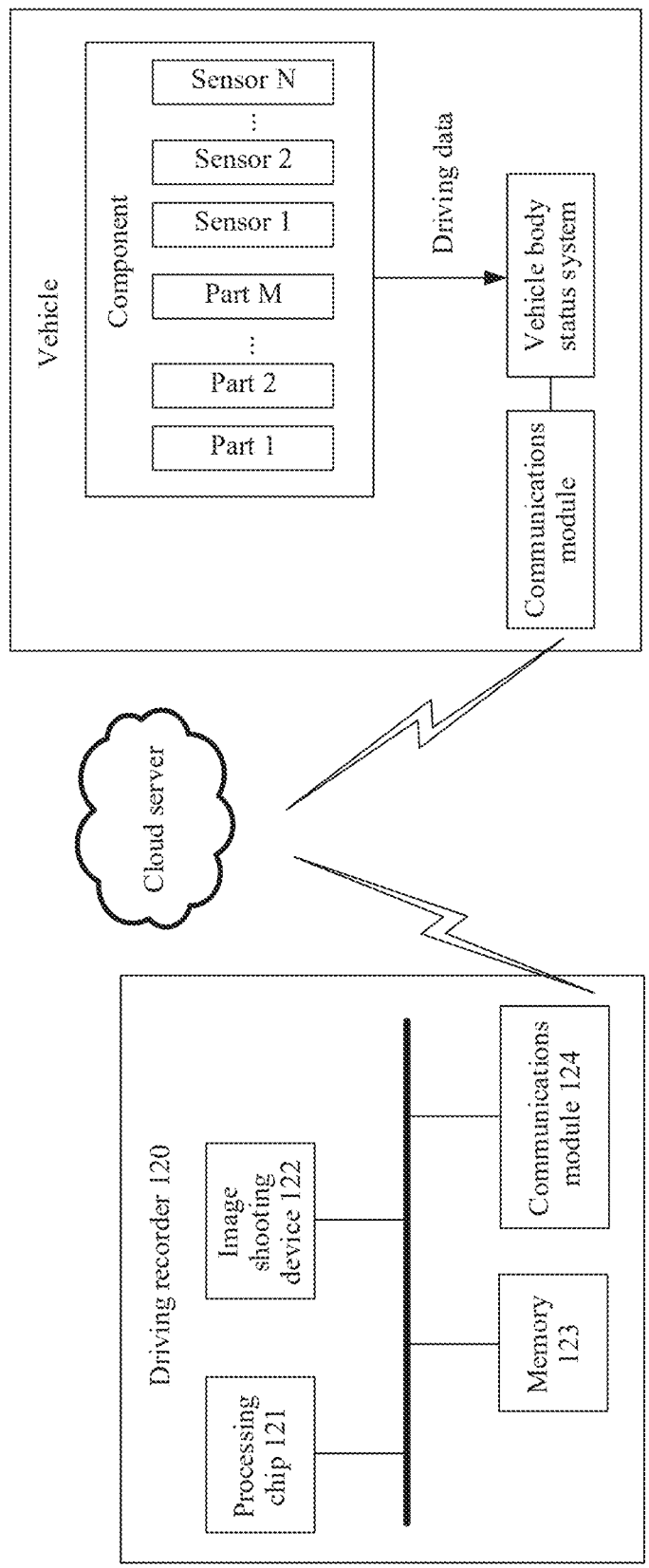
FIG. 13C is a schematic diagram of still another device connection according to an embodiment of this application.

In an actual application process, the driving recorder 120 is usually disposed on a vehicle. The following describes a connection relationship between the driving recorder and the vehicle with reference to FIG. 13A to FIG. 13C. In FIG. 13A to FIG. 13C, the driving recorder in FIG. 12B is used for description.

FIG. 13A is a schematic diagram of device connection according to an embodiment of this application. As shown in FIG. 13A, an interface may be disposed on the communications module 124 of the driving recorder 120, and an interface may be disposed on a vehicle.

In an actual application process, the interface on the driving recorder 120 may be connected to the interface on the vehicle, so that the driving recorder and the vehicle can communicate with each other by using the interfaces.

It should be noted that in the driving recorder, the interface may alternatively be disposed at another location. This is not specifically limited in this embodiment of this application.

FIG. 13B is a schematic diagram of another device connection according to an embodiment of this application. As shown in FIG. 13B, a communications module is disposed on the vehicle, and the communications module 124 in the driving recorder 120 may communicate (for example, through wireless communication) with the communications module on the vehicle. For example, the vehicle may send driving data to the driving recorder by using the communications modules.

FIG. 13C is a schematic diagram of still another device connection according to an embodiment of this application. As shown in FIG. 13C, a communications module is disposed on the vehicle, and a communications module in the vehicle may communicate with a server. For example, the vehicle may send driving data to a cloud server by using the communications module. The driving recorder 120 may communicate with the cloud server by using the communications module 124. For example, the driving recorder 120 may obtain the driving data from the cloud server by using the communications module 124.

It should be noted that FIG. 13A to FIG. 13C merely show an example of a structure of a vehicle, and do not constitute a limitation on the structure of the vehicle.

An embodiment of this application further provides a vehicle. The following describes structures of the vehicle with reference to FIG. 14A and FIG. 14B.

Figure 14A:
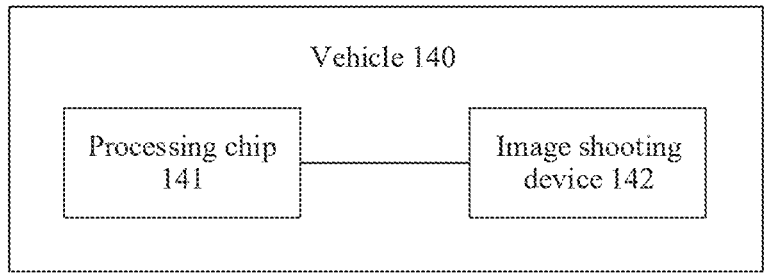
FIG. 14A is a schematic diagram of a structure of a vehicle according to an embodiment of this application.

FIG. 14A is a schematic diagram of a structure of a vehicle according to an embodiment of this application. As shown in FIG. 14A, a vehicle 140 may include a processing chip 141 and an image shooting device 142.

The image shooting device 141 is configured to shoot a driving record video.

The processing chip 142 is configured to: obtain first data and a first historical driving feature; determine, based on the first data and the first historical driving feature, that the vehicle is abnormal in a first time period; and annotate a driving record video based on the first time period. The first data includes first driving data of the vehicle in the first time period, and the first historical driving feature is determined based on historical driving data of the vehicle.

Optionally, the processing chip 122 may further perform the data processing method shown in the foregoing method embodiments. A process and beneficial effects thereof are similar, and details are not described herein again.

Figure 14B:
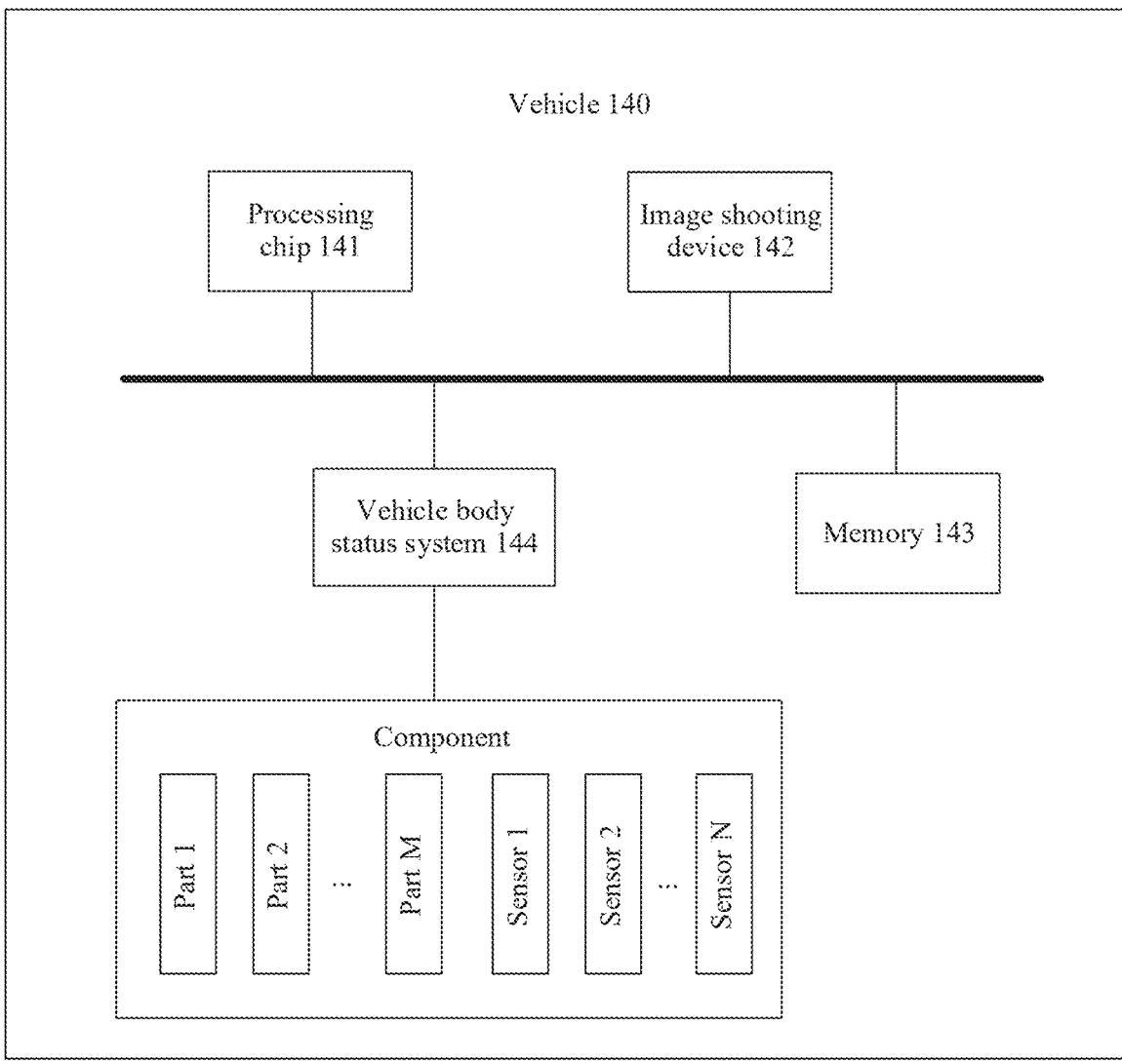
FIG. 14B is a schematic diagram of another structure of the vehicle according to an embodiment of this application.

FIG. 14B is a schematic diagram of another structure of the vehicle according to an embodiment of this application. Based on FIG. 14A, as shown in FIG. 14B, the vehicle may further include a memory 143, and the memory 143 is configured to store a driving record video.

Optionally, after an image shooting device 141 shoots and obtains the driving record video, the driving record video may be sent to the memory 143, to store the driving record video in the memory 143.

Optionally, the memory 143 may further store program instructions, and a processing chip 142 may perform, based on the program instructions, the technical solutions shown in the foregoing method embodiments.

As shown in FIG. 14B, the vehicle further includes a vehicle body status system 144. The vehicle body status system 144 may obtain first driving data, and send the first driving data to the processing chip 141. The vehicle further includes components. The components include a plurality of parts and a plurality of sensors. The vehicle body status system 144 may obtain the first driving data from the components of the vehicle.

Optionally, the vehicle 140 may further include a communications module (not shown in the figure), and the communications module may communicate with another device (for example, a cloud server).

Optionally, the vehicle 140 may further include a data collection device. The data collection device may include a camera, a millimeter-wave radar, a laser radar, an inertial sensor, or the like. The data collection device may obtain the first data.

Figure 15:
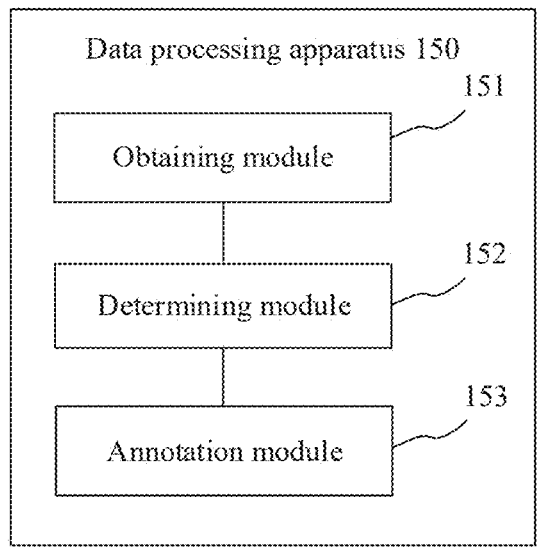
FIG. 15 is a schematic diagram of a structure of a data processing apparatus according to an embodiment of this application.

FIG. 15 is a schematic diagram of a structure of a data processing apparatus according to an embodiment of this application. As shown in FIG. 15, a data processing apparatus 150 may include an obtaining module 151, a determining module 152, and an annotation module 153.

The obtaining module 151 is configured to obtain first data and a first historical driving feature. The first data includes first driving data of a vehicle in a first time period, and the first historical driving feature is determined based on historical driving data of the vehicle.

The determining module 152 is configured to determine, based on the first data and the first historical driving feature, that the vehicle is abnormal in the first time period.

The annotation module 153 is configured to annotate a driving record video of the vehicle based on the first time period.

Optionally, the obtaining module 151 may perform S303 and S305 in the embodiment shown in FIGS. 3 and S1101 in the embodiment shown in FIG. 11.

Optionally, the determining module 152 may perform S306 and S307 in the embodiment shown in FIGS. 3 and S1102 in the embodiment shown in FIG. 11.

Optionally, the annotation module 153 may perform S308 in the embodiment shown in FIGS. 3 and S1103 in the embodiment shown in FIG. 11.

It should be noted that the data processing apparatus shown in this embodiment of this application may perform the technical solutions shown in the foregoing method embodiments. Implementation principles and beneficial effects of the data processing apparatus are similar to those of the technical solutions, and details are not described herein again.

In a possible implementation, the first driving data includes at least one of the following:
  status data of a component in the vehicle;
  running data of a component in the vehicle; or
  sensor data collected by a component in the vehicle.

In a possible implementation, the first historical driving feature includes a plurality of historical data curves corresponding to a plurality of types of historical driving data, the historical data curves are used to indicate a distribution rule of the historical driving data, and the historical driving data includes at least one of the following:
  historical status data of the component in the vehicle;
  historical running data of the component in the vehicle: or
  historical sensor data collected by the component in the vehicle.

In a possible implementation, the obtaining module is specifically configured to:
  process the historical driving data by using a first model, to obtain the first historical driving feature.

The first model is obtained by learning a plurality of groups of first samples, and each of the plurality of groups of first samples includes sample driving data and a sample historical driving feature.

In a possible implementation, the determining module 152 is specifically configured to:
  determine a similarity between the first data and the first historical driving feature; and
  determine, based on the similarity, that the vehicle is abnormal in the first time period.

In a possible implementation, the determining module 152 is specifically configured to:
  process the first data and the first historical driving feature by using a second model, to obtain the similarity.

The second model is obtained by learning a plurality of groups of second samples, each of the plurality of groups of second samples includes sample data, a sample driving feature, and a sample similarity, and the sample data includes sample driving data.

In a possible implementation, the determining module 152 is specifically configured to:
  determine, by using the second model, a first data curve corresponding to the first data; and
  compare the first data curve with the historical data curve in the first historical driving feature by using the second model to obtain the similarity.

In a possible implementation, the first data further includes scenario data, and the scenario data includes at least one of the following information:
  time information, location information, road condition information, or weather information.

In a possible implementation, the determining module 152 is specifically configured to:
  determine the first historical driving feature from a plurality of historical driving features based on the scenario data.

In a possible implementation, the annotation module 153 is specifically configured to:
  generate abnormality information; and
  annotate the abnormality information in the driving record video based on the first time period.

In a possible implementation, the abnormality information includes at least one of the following information:
  an abnormality level, an abnormality type, or abnormality description information.

It should be noted that the data processing apparatus shown in this embodiment of this application may perform the technical solutions shown in the foregoing method embodiments. Implementation principles and beneficial effects of the data processing apparatus are similar to those of the technical solutions, and details are not described herein again.

Figure 16:
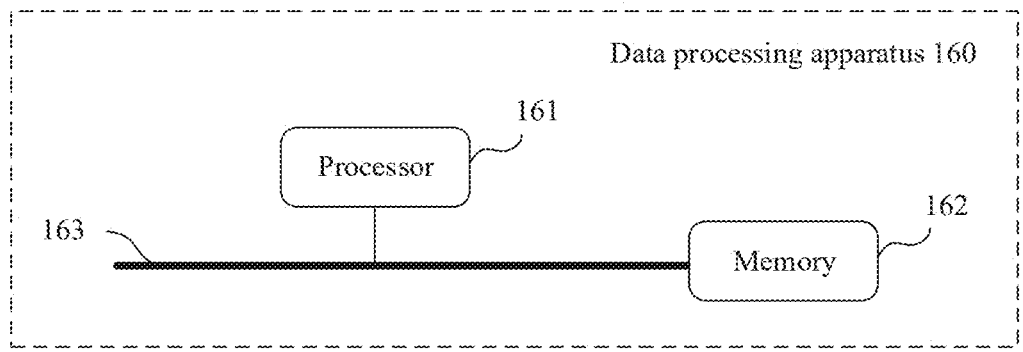
FIG. 16 is a schematic diagram of a hardware structure of a data processing apparatus according to an embodiment of this application.

FIG. 16 is a schematic diagram of a hardware structure of a data processing apparatus according to an embodiment of this application. As shown in FIG. 16, a data processing apparatus 160 may include a processor 161 and a memory 162. The processor 161 and the memory 162 may communicate with each other. For example, the processor 161 and the memory 162 communicate with each other by using a communications bus 163. The memory 162 is configured to store program instructions, and the processor 161 is configured to run the program instructions in the memory to perform the data processing method shown in any one of the foregoing method embodiments.

Optionally, the processor 161 may perform the steps in the embodiments shown in FIG. 3 or FIG. 11.

The data processing apparatus 160 may further include a transmitter and/or a receiver.

The processor may be a central processing unit (CPU), or may be another general-purpose processor, a digital signal processor (DSP), an application-specific integrated circuit (ASIC), or the like. The general-purpose processor may be a microprocessor, or the processor may be any conventional processor or the like. Steps of the methods disclosed with reference to this application may be directly implemented by a hardware processor, or may be implemented by a combination of hardware and software modules in the processor.

Optionally, the data processing apparatus 160 may be a chip, a driving recorder, a vehicle, a component in a driving recorder, a component in a vehicle, or the like.

When the data processing apparatus 160 is a driving recorder, the data processing apparatus may further include at least one of an image shooting device or a data collection device. Optionally, the data collection device may exist in a form of a sensor. For example, the data collection device may include: a camera, a millimeter-wave radar, a laser radar, an inertial sensor, or the like. The image shooting device is configured to shoot the driving record video, the data collection device is configured to obtain the first data, and the memory may be further configured to store the driving record video. For example, a structure of the data processing apparatus 160 may be shown as FIG. 12A or FIG. 12B.

When the data processing apparatus 160 is a vehicle, the data processing apparatus may further include at least one of an image shooting device or a data collection device. The image shooting device is configured to shoot the driving record video, the data collection device is configured to obtain the first data, and the memory may be further configured to store the driving record video. The data collection device may exist in a form of a sensor. For example, the data collection apparatus may include a camera, a millimeter-wave radar, a laser radar, an inertial sensor, or the like. The data collection device may further be a vehicle body status system configured to obtain the first driving data. For example, a structure of the data processing apparatus may be shown as FIG. 14A or FIG. 14B.

This application provides a readable storage medium, where the readable storage medium stores a computer program. The computer program is used to implement the data processing method according to any one of the foregoing embodiments.

An embodiment of this application provides a computer program product. The computer program product includes instructions, and when the instructions are executed, a computer is enabled to perform the foregoing data processing method.

All or some of the steps of the foregoing method embodiments may be implemented by a program instructing related hardware. The foregoing program may be stored in a readable memory. When the program is executed, the steps of the foregoing method embodiments are performed. The memory (storage medium) includes: a read-only memory (ROM), a RAM, a flash memory, a hard disk drive, a solid-state drive, a magnetic tape, a floppy disk, an optical disc, and any combination thereof.

Embodiments of this application are described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processing unit of another programmable data processing unit to generate a machine, so that instructions executed by a computer or the processing unit of the another programmable data processing unit generate an apparatus for implementing a specific function in one or more processes in the flowcharts and/or in one or more blocks in the block diagrams.

The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

It is clear that a person skilled in the art can make various modifications and variations to embodiments of this application without departing from the scope of this application. This application is intended to cover these modifications and variations provided that the modifications and variations of embodiments of this application fall within the scope of protection defined by the following claims and their equivalent technologies.

In this application, the term "including" and a variant thereof may refer to non-limitative inclusion: the term "or" and a variant thereof may refer to "and/or". In this application, the terms "first", "second", and the like are intended to distinguish between similar objects but do not necessarily indicate a specific order or sequence. "A plurality of" in this application refers to two or more than two. The term "and/or" describes an association relationship for associated objects and represents that three relationships may exist. For example. A and/or B may represent the following three cases: Only A exists, both A and B exist, and only B exists. The character "/" usually indicates an "or" relationship between the associated objects.

What is claimed is:

1. A data processing apparatus, comprising at least one processor and at least one memory, wherein the at least one memory stores instructions, and the at least one processor is coupled to the at least one memory to execute the instructions to:

obtain first data and a first historical driving feature, wherein the first data comprises first driving data of a vehicle in a first time period, the first historical driving feature is determined based on historical driving data of the vehicle in a second time period before the first time period, the vehicle includes the data processing apparatus, at least one sensor, and a driving recorder, and the driving recorder is configured to record a driving video of the vehicle;

determine, based on the first data and the first historical driving feature, abnormality of the vehicle in the first time period; and annotate a video recorded by the driving recorder in the first time period with information describing the abnormality, wherein the annotated information is used for video clip searching.

2. The apparatus according to claim 1, wherein the first driving data comprises at least one of the following:
   status data of a component in the vehicle;
   running data of a component in the vehicle; or
   sensor data collected by the at least one sensor in the vehicle.

3. The apparatus according to claim 1, wherein the first data further comprises scenario data, and the scenario data comprises at least one of the following information:
   time information, location information, road condition information, or weather information.

4. The apparatus according to claim 3, wherein the at least one processor is coupled to the at least one memory to execute the instructions to:
   determine the first historical driving feature from a plurality of historical driving features based on the scenario data.

5. The apparatus according to claim 1, wherein the at least one processor is coupled to the at least one memory to execute the instructions to:
   process the historical driving data by using a first model to obtain the first historical driving feature, wherein:
   the first model is obtained by learning a plurality of groups of first samples, and each of the plurality of groups of first samples comprises sample driving data and a sample historical driving feature.

6. The apparatus according to claim 1, wherein the at least one processor is coupled to the at least one memory to execute the instructions to:
   determine a similarity between the first data and the first historical driving feature; and
   determine, based on the similarity, the abnormality in the first time period.

7. The apparatus according to claim 6, wherein the at least one processor is coupled to the at least one memory to execute the instructions to:
   process the first data and the first historical driving feature by using a second model to obtain the similarity, wherein:
   the second model is obtained by learning a plurality of groups of second samples, each of the plurality of groups of second samples comprises sample data, a sample driving feature, and a sample similarity, and the sample data comprises sample driving data.

8. The apparatus according to claim 7, wherein the at least one processor is coupled to the at least one memory to execute the instructions to:
   determine, by using the second model, a first data curve corresponding to the first data; and
   compare, the first data curve with a historical data curve in the first historical driving feature by using the second model to obtain the similarity.

9. A data processing apparatus, comprising at least one processor and at least one memory, wherein the at least one memory stores program instructions, and the at least one processor is coupled to the at least one memory to execute the program instructions to:
   obtain first data and a first historical driving feature, wherein the first data comprises first driving data of a vehicle in a first time period, the first historical driving feature is determined based on historical driving data of the vehicle in a second time period before the first time period, the vehicle includes the data processing apparatus, at least one sensor, and a driving recorder, and the driving recorder is configured to record a driving video of the vehicle;
   determine, based on the first data and the first historical driving feature, abnormality of the vehicle in the first time period;
   generate abnormal information to indicate a correspondence between the first time period and a description of the abnormality; and
   annotate a driving record video of the vehicle with the abnormal information, wherein the annotated abnormal information is used as attribute information of the driving record video of the vehicle for video clip searching.

10. The apparatus according to claim 9, wherein the first driving data comprises at least one of the following:
    status data of a component in the vehicle;
    running data of a component in the vehicle; or
    sensor data collected by a component in the vehicle.

11. The apparatus according to claim 9, wherein the first data further comprises scenario data, and the scenario data comprises at least one of the following information:
    time information, location information, road condition information, or weather information.

12. The apparatus according to claim 11, wherein the at least one processor is coupled to the at least one memory to execute the instructions to:
    determine the first historical driving feature from a plurality of historical driving features based on the scenario data.

13. The apparatus according to claim 9, wherein the at least one processor is coupled to the at least one memory to execute the instructions to:
    process the historical driving data by using a first model to obtain the first historical driving feature, wherein:
    the first model is obtained by learning a plurality of groups of first samples, and each of the plurality of groups of first samples comprises sample driving data and a sample historical driving feature.

14. The apparatus according to claim 9, wherein the at least one processor is coupled to the at least one memory to execute the instructions to:
    determine a similarity between the first data and the first historical driving feature; and
    determine, based on the similarity, the abnormality in the first time period.

15. A data processing apparatus, comprising at least one processor and at least one memory, wherein the at least one memory stores instructions, and the at least one processor is coupled to the at least one memory to execute the instructions to:
    obtain first data and a first historical driving feature, wherein the first data comprises first driving data of a vehicle in a first time period, the first historical driving feature is determined based on historical driving data of the vehicle in a second time period before the first time period, the vehicle includes the data processing apparatus, at least one sensor, and a driving recorder, and the driving recorder is configured to record a driving video of the vehicle;
    determine, based on the first data and the first historical driving feature, abnormality of the vehicle in the first time period; and annotate a driving record video of the vehicle with description information about the abnormality, wherein the description information is annotated in a form of a subtitle to a video picture relative to the first time period in the driving record video of the vehicle and is used for video clip searching.

16. The apparatus according to claim 15, wherein the first driving data comprises at least one of the following:
 status data of a component in the vehicle;
 running data of a component in the vehicle; or
 sensor data collected by a component in the vehicle.

17. The apparatus according to claim 15, wherein the first data further comprises scenario data, and the scenario data comprises at least one of the following information:
 time information, location information, road condition information, or weather information.

18. The apparatus according to claim 17, wherein the at least one processor is coupled to the at least one memory to execute the instructions to:
 determine the first historical driving feature from a plurality of historical driving features based on the scenario data.

19. The apparatus according to claim 15, wherein the at least one processor is coupled to the at least one memory to execute the instructions to:
 process the historical driving data by using a first model to obtain the first historical driving feature, wherein:
 the first model is obtained by learning a plurality of groups of first samples, and each of the plurality of groups of first samples comprises sample driving data and a sample historical driving feature.

20. The apparatus according to claim 15, wherein the at least one processor is coupled to the at least one memory to execute the instructions to:
 determine a similarity between the first data and the first historical driving feature; and
 determine, based on the similarity, the abnormality in the first time period.

\* \* \* \* \*